United States Patent
Islam et al.

(10) Patent No.: US 11,259,268 B2
(45) Date of Patent: Feb. 22, 2022

(54) CONVEYING PRESENCE OF ENHANCED PAGING MECHANISM

(71) Applicant: QUALCOMM Incorporated, San Diego, CA (US)

(72) Inventors: Muhammad Nazmul Islam, Littleton, MA (US); Tao Luo, San Diego, CA (US); Xiao Feng Wang, San Diego, CA (US); Sumeeth Nagaraja, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/250,718

(22) Filed: Jan. 17, 2019

(65) Prior Publication Data

US 2019/0230624 A1    Jul. 25, 2019

Related U.S. Application Data

(60) Provisional application No. 62/620,462, filed on Jan. 22, 2018.

(51) Int. Cl.
*H04W 68/02* (2009.01)
*H04W 72/14* (2009.01)
(Continued)

(52) U.S. Cl.
CPC .......... *H04W 68/02* (2013.01); *H04W 72/14* (2013.01); *H04W 16/28* (2013.01); *H04W 48/10* (2013.01)

(58) Field of Classification Search
CPC ..... H04W 68/02; H04W 72/14; H04W 48/10; H04W 16/28; H04W 48/12
See application file for complete search history.

(56) References Cited

U.S. PATENT DOCUMENTS

| | | | |
|---|---|---|---|
| 2017/0280481 A1* | 9/2017 | Stern-Berkowitz | ........................ H04W 74/0833 |
| 2017/0367069 A1* | 12/2017 | Agiwal | ................ H04B 7/0695 |
| 2019/0068348 A1* | 2/2019 | Nam | ..................... H04L 5/0053 |

FOREIGN PATENT DOCUMENTS

| WO | WO-2016073118 A1 | 5/2016 |
|---|---|---|
| WO | WO-2018144873 A1 | 8/2018 |

OTHER PUBLICATIONS

Ericsson: "Means and Configuration of Paging Delivery in NR", 3GPP Draft; R2-1700550—Means and Configuration of Paging Delivery in NR, 3rd Generation Partnership Project (3GPP), Mobile Competence Centre; 650, Route Des Lucioles; F-06921 Sophia-Anti Polls Cedex; France, vol. RAN WG2, No. Spokane, USA; Jan. 17, 2017-Jan. 19, 2017 Jan. 7, 2017, XP051204088, Retrieved from the Internet: URL:http://www.3gpp.org/ftp/tsgran/WG2_RL2/TSGR2_AHs/2017_01_NR/Docs/ [retrieved on Jan. 7, 2017], 3 pages.

(Continued)

*Primary Examiner* — Marcos L Torres
(74) *Attorney, Agent, or Firm* — Danai Nelisile Mhembere; Holland & Hart LLP

(57) ABSTRACT

Methods, systems, and devices for wireless communications are described. A base station may transmit, within system information, a paging mechanism indication identifying one or more paging mechanisms supported by a network. The base station may transmit a paging grant in accordance with one of the one or more paging mechanisms supported by the network. The base station may transmit a paging message to a user equipment (UE) in accordance with the one of the one or more paging mechanisms supported by the network.

30 Claims, 17 Drawing Sheets

(51) Int. Cl.
*H04W 16/28* (2009.01)
*H04W 48/10* (2009.01)

(56) References Cited

OTHER PUBLICATIONS

International Search Report and Written Opinion—PCT/US2019/014235—ISA/EPO—dated Apr. 2, 2019.
NTT Docomo et al., "Discussion on Paging Design for NR", 3GPP Draft; R1-1718182_Discussion on Paging Design for NR_Final, 3rd Generation Partnership Project (3GPP), Mobile Competence Centre; 650, Route Des Lucioles; F-06921 Sophia-Anti Polls Cedex; France, vol. RAN WG1, No. Prague, Czech Republic; Oct. 9, 2017-Oct. 13, 2017 Oct. 8, 2017, XP051341364, Retrieved from the Internet: URL:http://www.3gpp.org/ftp/Meetings_3GPP_SYNC/RAN1/Docs/ [retrieved on Oct. 8, 2017], 3 pages.
Qualcomm Incorporated: "Paging Design Consideration", 3GPP Draft; R1-1705570 Paging Design Consideration, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), XP051243698, Retrieved from the Internet: URL:http://www.3gpp.org/ftp/Meetings_3GPP_SYNC/RAN1/Docs/ [retrieved on Apr. 2, 2017], 8 pages.
TCL Communication: "NR Paging Overhead Reduction", R1-1719705_NR_PAGING_OVERHEAD_REDUCTION_TCL_FINAL, 3rd Generation Partnership Project (3GPP), Mobile Competence Centre; 650, Route Des Lucioles; F-06921 Sophia-Anti Polls Cedex; France, vol. RAN WG1, No. Reno, USA; Nov. 27, 2017-Dec. 1, 2017, Nov. 17, 2017, XP051368861, Retrieved from the Internet: URL:http://www.3gpp.org/ftp/tsg%5Fran/WG1%5FRL1/TSGR1%5F91/Docs/ [retrieved on Nov. 17, 2017], 5 pages.

\* cited by examiner

Paging Indication
(All Directions)

Response
(Beam Report)

CONVEYING PRESENCE OF ENHANCED PAGING MECHANISM

CROSS REFERENCES

The present Application for Patent claims the benefit of U.S. Provisional Patent Application No. 62/620,462 by ISLAM, et al., entitled "CONVEYING PRESENCE OF ENHANCED PAGING MECHANISM," filed Jan. 22, 2018, assigned to the assignee hereof, and expressly incorporated by reference herein.

BACKGROUND

The following relates generally to wireless communication, and more specifically to conveying presence of enhanced paging mechanism.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

Wireless communication networks may support paging events between the base station and UE. The paging events may occur according to a paging mechanism that includes the base station determining that it has information to communicate to a UE. The base station may transmit a paging grant to the UE that identifies resources for the paging message, and then transmit the paging message using the resources identified in the paging grant. The UE may be operating in a discontinuous reception (DRX) mode, in some instances, and may periodically monitor for paging signals from the base station during an On Duration of the DRX mode. The UE may receive the paging grant and receive the paging message according to the identified resources. The UE may respond to the paging message by establishing a connection with the base station, e.g., by transmitting a radio resource control (RRC) connection establishment message, to communicate the information. However, some networks may support multiple paging mechanisms, while some UEs may only support a single type of paging mechanism. A UE operating in a network that supports a paging mechanism that is not supported by the UE may experience inefficiencies in power use as the UE may awake to receive paging signals, even though the UE may not ultimately be able to receive or decode the paging signals due to the different paging mechanisms being used.

SUMMARY

The described techniques relate to improved methods, systems, devices, or apparatuses that support conveying presence of enhanced paging mechanism. Generally, the described techniques provide for a mechanism for a base station to provide an indication of the paging mechanism to be used by the network. For example, the base station may determine which paging mechanism the network supports and has been selected for use. Examples of the paging mechanisms may include a traditional paging mechanism or an enhanced paging mechanism. The base station may transmit a signal to a user equipment (UE) that identifies or otherwise conveys an indication of the supported paging mechanisms of the network and, in some instances, which paging mechanism is to be used. For example, the base station may configure bit(s) in a system information signal, may select a paging radio network temporary identifier (P-RNTI) that corresponds to a particular paging mechanism, and the like, to convey the indication of the paging mechanism. The indication of the paging mechanism may be communicated once, as-needed, or according to a periodic schedule. The base station may transmit the paging grant to the UE according to the selected paging mechanism.

A method of wireless communication is described. The method may include transmitting, within system information, a paging mechanism indication identifying one or more paging mechanisms supported by a network, transmitting a paging grant in accordance with one of the one or more paging mechanisms supported by the network, and transmitting a paging message to a UE in accordance with the one of the one or more paging mechanisms supported by the network.

An apparatus for wireless communication is described. The apparatus may include means for transmitting, within system information, a paging mechanism indication identifying one or more paging mechanisms supported by a network, means for transmitting a paging grant in accordance with one of the one or more paging mechanisms supported by the network, and means for transmitting a paging message to a UE in accordance with the one of the one or more paging mechanisms supported by the network.

Another apparatus for wireless communication is described. The apparatus may include a processor, memory in electronic communication with the processor, and instructions stored in the memory. The instructions may be operable to cause the processor to transmit, within system information, a paging mechanism indication identifying one or more paging mechanisms supported by a network, transmit a paging grant in accordance with one of the one or more paging mechanisms supported by the network, and transmit a paging message to a UE in accordance with the one of the one or more paging mechanisms supported by the network.

A non-transitory computer-readable medium for wireless communication is described. The non-transitory computer-readable medium may include instructions operable to cause a processor to transmit, within system information, a paging mechanism indication identifying one or more paging mechanisms supported by a network, transmit a paging grant in accordance with one of the one or more paging mechanisms supported by the network, and transmit a paging message to a UE in accordance with the one of the one or more paging mechanisms supported by the network.

In some examples of the method, apparatus, and non-transitory computer-readable medium described above, transmitting the paging mechanism indication comprises transmitting the paging mechanism indication via a master information block (MIB).

In some examples of the method, apparatus, and non-transitory computer-readable medium described above, transmitting the paging mechanism indication comprises transmitting the paging mechanism indication via remaining minimum system information (RMSI).

In some examples of the method, apparatus, and non-transitory computer-readable medium described above, transmitting the paging mechanism indication comprises transmitting the paging mechanism indication via broadcast other system information (OSI).

In some examples of the method, apparatus, and non-transitory computer-readable medium described above, the paging mechanism indication may be a one-bit indication.

In some examples of the method, apparatus, and non-transitory computer-readable medium described above, the paging mechanism indication identifies whether the network supports a first paging mechanism or any of a plurality of enhanced paging mechanisms.

Some examples of the method, apparatus, and non-transitory computer-readable medium described above may further include processes, features, means, or instructions for organizing the UE into a first group of a plurality of groups of UEs. Some examples of the method, apparatus, and non-transitory computer-readable medium described above may further include processes, features, means, or instructions for transmitting, in a plurality of directions corresponding to a plurality of transmit beams, a paging indication to UEs in the first group. Some examples of the method, apparatus, and non-transitory computer-readable medium described above may further include processes, features, means, or instructions for receiving, from the UE and in response to the paging indication, a beam indication identifying one or more transmit beams of the plurality of transmit beams on which the UE received the paging indication.

In some examples of the method, apparatus, and non-transitory computer-readable medium described above, transmitting the paging grant in accordance with one of the one or more paging mechanisms supported by the network comprises transmitting the paging grant on the one or more transmit beams corresponding to the beam indication.

In some examples of the method, apparatus, and non-transitory computer-readable medium described above, transmitting the paging message to the UE in accordance with the one of the one or more paging mechanisms supported by the network comprises transmitting the paging message to the UE on the one or more transmit beams corresponding to the beam indication.

Some examples of the method, apparatus, and non-transitory computer-readable medium described above may further include processes, features, means, or instructions for organizing the UE into a first group of a plurality of groups of UEs. Some examples of the method, apparatus, and non-transitory computer-readable medium described above may further include processes, features, means, or instructions for transmitting, in a paging indication to UEs in the first group, an indication that the UEs may be organized in the first group.

In some examples of the method, apparatus, and non-transitory computer-readable medium described above, transmitting the paging grant in accordance with one of the one or more paging mechanisms supported by the network comprises including a paging index in the paging grant, indicating that the paging grant may be for the UEs of the first group.

A method of wireless communication is described. The method may include receiving, at a UE and via system information, a paging mechanism indication identifying one or more paging mechanisms supported by a network, receiving, at the UE, a paging grant in accordance with one of the one or more paging mechanisms supported by the network, and receiving, at the UE, a paging message in accordance with the one of the one or more paging mechanisms supported by the network.

An apparatus for wireless communication is described. The apparatus may include means for receiving, at a UE and via system information, a paging mechanism indication identifying one or more paging mechanisms supported by a network, means for receiving, at the UE, a paging grant in accordance with one of the one or more paging mechanisms supported by the network, and means for receiving, at the UE, a paging message in accordance with the one of the one or more paging mechanisms supported by the network.

Another apparatus for wireless communication is described. The apparatus may include a processor, memory in electronic communication with the processor, and instructions stored in the memory. The instructions may be operable to cause the processor to receive, at a UE and via system information, a paging mechanism indication identifying one or more paging mechanisms supported by a network, receive, at the UE, a paging grant in accordance with one of the one or more paging mechanisms supported by the network, and receive, at the UE, a paging message in accordance with the one of the one or more paging mechanisms supported by the network.

A non-transitory computer-readable medium for wireless communication is described. The non-transitory computer-readable medium may include instructions operable to cause a processor to receive, at a UE and via system information, a paging mechanism indication identifying one or more paging mechanisms supported by a network, receive, at the UE, a paging grant in accordance with one of the one or more paging mechanisms supported by the network, and receive, at the UE, a paging message in accordance with the one of the one or more paging mechanisms supported by the network.

In some examples of the method, apparatus, and non-transitory computer-readable medium described above, receiving the paging mechanism indication comprises receiving the paging mechanism indication via a MIB.

In some examples of the method, apparatus, and non-transitory computer-readable medium described above, receiving the paging mechanism indication comprises receiving the paging mechanism indication via RMSI.

In some examples of the method, apparatus, and non-transitory computer-readable medium described above, receiving the paging mechanism indication comprises receiving the paging mechanism indication via broadcast OSI.

In some examples of the method, apparatus, and non-transitory computer-readable medium described above, the paging mechanism indication may be a one-bit indication.

In some examples of the method, apparatus, and non-transitory computer-readable medium described above, the paging mechanism indication identifies whether the network supports a first paging mechanism or any of a plurality of enhanced paging mechanisms.

Some examples of the method, apparatus, and non-transitory computer-readable medium described above may further include processes, features, means, or instructions for receiving a paging indication via one or more transmit beams corresponding to different transmit directions from the network. Some examples of the method, apparatus, and non-transitory computer-readable medium described above may further include processes, features, means, or instructions for transmitting, in response to the paging indication, a beam indication identifying the one or more transmit beams of the plurality of transmit beams on which the UE received the paging indication.

In some examples of the method, apparatus, and non-transitory computer-readable medium described above, receiving the paging grant in accordance with one of the one or more paging mechanisms supported by the network comprises receiving the paging grant via at least one of the one or more transmit beams corresponding to the beam indication.

In some examples of the method, apparatus, and non-transitory computer-readable medium described above, receiving the paging message in accordance with the one of the one or more paging mechanisms supported by the network comprises receiving the paging message via the at least one of the one or more transmit beams corresponding to the beam indication.

Some examples of the method, apparatus, and non-transitory computer-readable medium described above may further include processes, features, means, or instructions for receiving, in a paging indication, an indication that the UE may be organized in a first group of a plurality of groups of UEs.

In some examples of the method, apparatus, and non-transitory computer-readable medium described above, receiving the paging grant in accordance with one of the one or more paging mechanisms supported by the network comprises receiving a paging index in the paging grant, indicating that the paging grant may be for UEs of the first group.

A method of wireless communication is described. The method may include scrambling, using a P-RNTI, at least a portion of a paging grant, wherein the P-RNTI is a function of a paging mechanism supported by a network, transmitting the paging grant in accordance with the paging mechanism supported by the network, and transmitting a paging message to a UE in accordance with the paging mechanism supported by the network.

An apparatus for wireless communication is described. The apparatus may include means for scrambling, using a P-RNTI, at least a portion of a paging grant, wherein the P-RNTI is a function of a paging mechanism supported by a network, means for transmitting the paging grant in accordance with the paging mechanism supported by the network, and means for transmitting a paging message to a UE in accordance with the paging mechanism supported by the network.

Another apparatus for wireless communication is described. The apparatus may include a processor, memory in electronic communication with the processor, and instructions stored in the memory. The instructions may be operable to cause the processor to scramble, using a P-RNTI, at least a portion of a paging grant, wherein the P-RNTI is a function of a paging mechanism supported by a network, transmit the paging grant in accordance with the paging mechanism supported by the network, and transmit a paging message to a UE in accordance with the paging mechanism supported by the network.

A non-transitory computer-readable medium for wireless communication is described. The non-transitory computer-readable medium may include instructions operable to cause a processor to scramble, using a P-RNTI, at least a portion of a paging grant, wherein the P-RNTI is a function of a paging mechanism supported by a network, transmit the paging grant in accordance with the paging mechanism supported by the network, and transmit a paging message to a UE in accordance with the paging mechanism supported by the network.

In some examples of the method, apparatus, and non-transitory computer-readable medium described above, scrambling the at least a portion of the paging grant comprises scrambling a CRC portion of the paging grant using the P-RNTI.

In some examples of the method, apparatus, and non-transitory computer-readable medium described above, the P-RNTI may be a function of whether the network supports a first paging mechanism or any of a plurality of enhanced paging mechanisms.

In some examples of the method, apparatus, and non-transitory computer-readable medium described above, a relationship between the P-RNTI and the paging mechanism supported by the network may be predefined.

Some examples of the method, apparatus, and non-transitory computer-readable medium described above may further include processes, features, means, or instructions for indicating to the UE a relationship between the P-RNTI and the paging mechanism supported by the network in advance of transmitting the paging grant.

In some examples of the method, apparatus, and non-transitory computer-readable medium described above, indicating the relationship between the P-RNTI and the paging mechanism supported by the network comprises transmitting an indication of the relationship in system information.

Some examples of the method, apparatus, and non-transitory computer-readable medium described above may further include processes, features, means, or instructions for organizing the UE into a first group of a plurality of groups of UEs. Some examples of the method, apparatus, and non-transitory computer-readable medium described above may further include processes, features, means, or instructions for transmitting, in a plurality of directions corresponding to a plurality of transmit beams, a paging indication to UEs in the first group. Some examples of the method, apparatus, and non-transitory computer-readable medium described above may further include processes, features, means, or instructions for receiving, from the UE and in response to the paging indication, a beam indication identifying one or more transmit beams of the plurality of transmit beams on which the UE received the paging indication.

In some examples of the method, apparatus, and non-transitory computer-readable medium described above, transmitting the paging grant in accordance with one of the one or more paging mechanisms supported by the network comprises transmitting the paging grant on the one or more transmit beams corresponding to the beam indication.

In some examples of the method, apparatus, and non-transitory computer-readable medium described above, transmitting the paging message to the UE in accordance with the one of the one or more paging mechanisms supported by the network comprises transmitting the paging message to the UE on the one or more transmit beams corresponding to the beam indication.

Some examples of the method, apparatus, and non-transitory computer-readable medium described above may further include processes, features, means, or instructions for organizing the UE into a first group of a plurality of groups of UEs. Some examples of the method, apparatus, and non-transitory computer-readable medium described above may further include processes, features, means, or instructions for transmitting, in a paging indication to UEs in the first group, an indication that the UEs may be organized in the first group.

In some examples of the method, apparatus, and non-transitory computer-readable medium described above, transmitting the paging grant in accordance with one of the one or more paging mechanisms supported by the network comprises including a paging index in the paging grant, indicating that the paging grant may be for the UEs of the first group.

A method of wireless communication is described. The method may include receiving a paging grant, wherein at least a portion of the paging grant is scrambled using a P-RNTI that is a function of a paging mechanism supported by a network, unscrambling the at least a portion of the paging grant using the P-RNTI, and receiving a paging message in accordance with the paging mechanism supported by the network.

An apparatus for wireless communication is described. The apparatus may include means for receiving a paging grant, wherein at least a portion of the paging grant is scrambled using a P-RNTI that is a function of a paging mechanism supported by a network, means for unscrambling the at least a portion of the paging grant using the P-RNTI, and means for receiving a paging message in accordance with the paging mechanism supported by the network.

Another apparatus for wireless communication is described. The apparatus may include a processor, memory in electronic communication with the processor, and instructions stored in the memory. The instructions may be operable to cause the processor to receive a paging grant, wherein at least a portion of the paging grant is scrambled using a P-RNTI that is a function of a paging mechanism supported by a network, unscramble the at least a portion of the paging grant using the P-RNTI, and receive a paging message in accordance with the paging mechanism supported by the network.

A non-transitory computer-readable medium for wireless communication is described. The non-transitory computer-readable medium may include instructions operable to cause a processor to receive a paging grant, wherein at least a portion of the paging grant is scrambled using a P-RNTI that is a function of a paging mechanism supported by a network, unscramble the at least a portion of the paging grant using the P-RNTI, and receive a paging message in accordance with the paging mechanism supported by the network.

In some examples of the method, apparatus, and non-transitory computer-readable medium described above, the at least a portion of the paging grant that may be scrambled using the P-RNTI may be a CRC portion of the paging grant.

In some examples of the method, apparatus, and non-transitory computer-readable medium described above, the P-RNTI may be a function of whether the network supports a first paging mechanism or any of a plurality of enhanced paging mechanisms.

In some examples of the method, apparatus, and non-transitory computer-readable medium described above, a relationship between the P-RNTI and the paging mechanism supported by the network may be predefined.

Some examples of the method, apparatus, and non-transitory computer-readable medium described above may further include processes, features, means, or instructions for receiving an indication of a relationship between the P-RNTI and the paging mechanism supported by the network in advance of receiving the paging grant.

In some examples of the method, apparatus, and non-transitory computer-readable medium described above, receiving the indication of the relationship between the P-RNTI and the paging mechanism supported by the network comprises receiving the indication of the relationship in system information.

Some examples of the method, apparatus, and non-transitory computer-readable medium described above may further include processes, features, means, or instructions for receiving a paging indication via one or more transmit beams corresponding to different transmit directions from the network. Some examples of the method, apparatus, and non-transitory computer-readable medium described above may further include processes, features, means, or instructions for transmitting, in response to the paging indication, a beam indication identifying the one or more transmit beams of the plurality of transmit beams on which the UE received the paging indication.

In some examples of the method, apparatus, and non-transitory computer-readable medium described above, receiving the paging grant in accordance with one of the one or more paging mechanisms supported by the network comprises receiving the paging grant via at least one of the one or more transmit beams corresponding to the beam indication.

In some examples of the method, apparatus, and non-transitory computer-readable medium described above, receiving the paging message in accordance with the one of the one or more paging mechanisms supported by the network comprises receiving the paging message via the at least one of the one or more transmit beams corresponding to the beam indication.

Some examples of the method, apparatus, and non-transitory computer-readable medium described above may further include processes, features, means, or instructions for receiving, in a paging indication, an indication that the UE may be organized in a first group of a plurality of groups of UEs.

In some examples of the method, apparatus, and non-transitory computer-readable medium described above, receiving the paging grant in accordance with one of the one or more paging mechanisms supported by the network comprises receiving a paging index in the paging grant, indicating that the paging grant may be for UEs of the first group.

DETAILED DESCRIPTION

Figure 1:
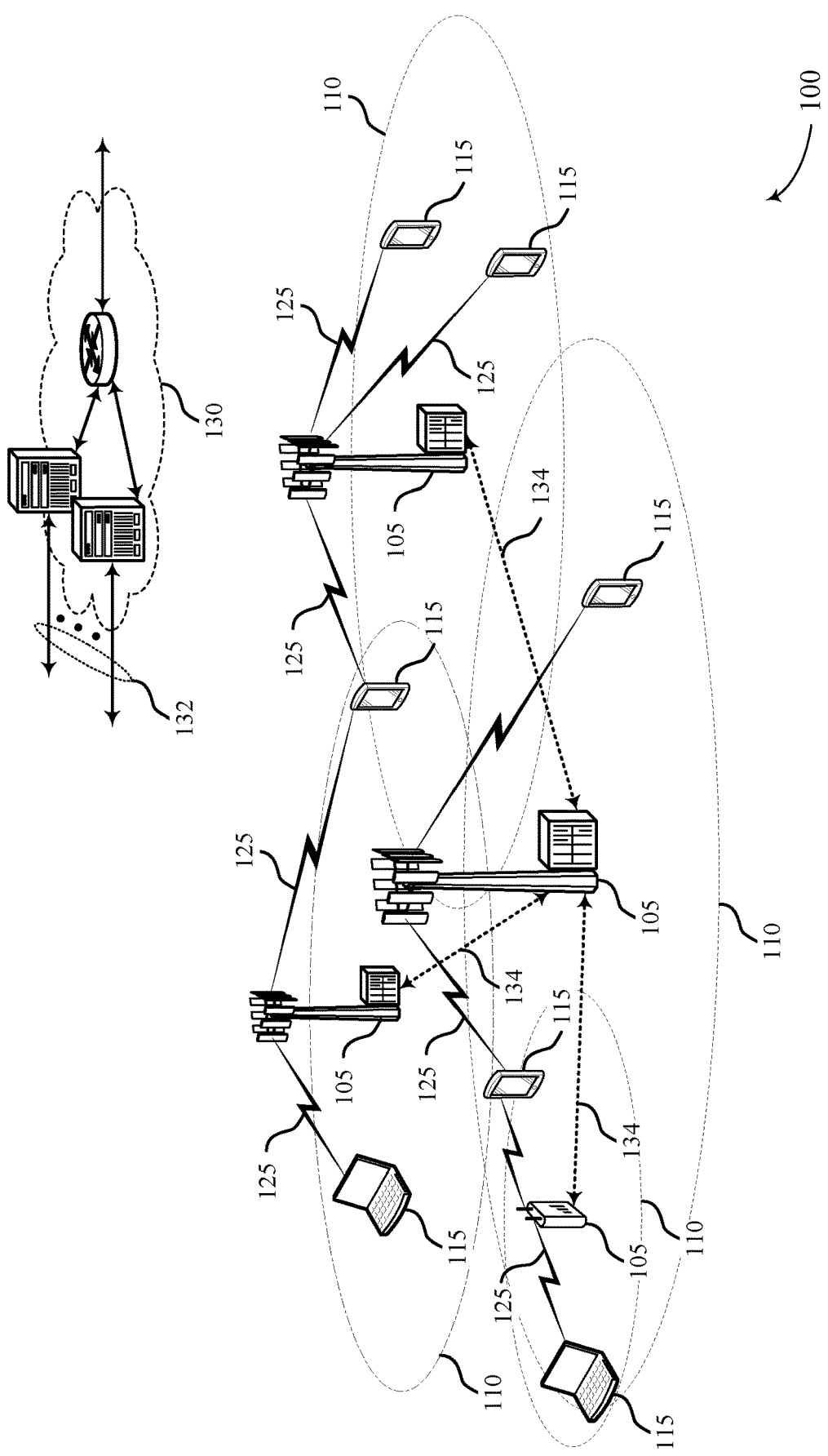
FIG. 1 illustrates an example of a system for wireless communication that supports conveying presence of enhanced paging mechanism in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

Wireless communication networks may support paging events using different paging mechanisms. Generally, the paging mechanisms may include a traditional paging mechanism (e.g., a release 15 (R15) paging mechanism) and one or more enhanced paging mechanisms. An example of a R15 paging mechanism may simply include the base station transmitting the paging grant identifying the resources (e.g., in a physical downlink control channel (PDCCH) signal) and then transmitting the paging message using the identified resources (e.g., in a physical downlink shared channel (PDSCH) signal). Some enhanced paging mechanism examples may include use of a paging indication signal. As one example in a mmW network, the paging indication may provide an indication that a group of UEs are being paged. UE(s) may respond with a feedback signal and the base station may transmit the paging grants in the directions that it received feedback signals from. As another example, the paging indication may be a compressed paging indication carried in the PDCCH. The compressed paging indication in the PDCCH may permit the UE to avoid PDSCH decoding when there is no page for the UE. Regardless of which paging mechanism is being used for a network, there is a need to provide an efficient indication of which paging mechanism is being used in order to ensure that paging mechanism's protocols are followed during a paging event (e.g., for compatible UEs).

Aspects of the disclosure are initially described in the context of a wireless communications system. Aspects of the present disclosure provide for implementation of a more efficient and comprehensive technique for providing an indication of the current (or active) paging mechanism. In some aspects, the indication of the paging mechanism may be carried or otherwise conveyed as bit(s) in an information block signal, e.g., in a master information block (MIB), a remaining minimum system information (RMSI) signal, and/or a broadcast other system information block (OSI). Additionally or alternatively, the indication of the paging mechanism may be indicated based on a particular paging radio network temporary identifier (P-RNTI). That is, conventional techniques provide for a fixed P-RNTI to be used for all paging occasions. Aspects of the described techniques provide for multiple P-RNTIs being available, and each P-RNTI corresponds to a particular paging mechanism. In some aspects, the indication of the paging mechanism may be a single bit that identifies whether the paging mechanism is a R15 paging mechanism or an enhanced paging mechanism. In some aspects, the indication of the paging mechanism may be one or more bits that identify which paging mechanism is being used. In some aspects, the paging mechanism indication may be communicated once or may be communicated more than once, e.g., as needed and in response to a change in the paging mechanism and/or according to a periodic schedule. Accordingly, the base station may transmit the indication in the system information/information block and/or based on the selected P-RNTI and then perform the paging event in accordance with the protocols of the paging mechanism, e.g., transmit the paging grant/paging message.

Aspects of the disclosure are further illustrated by and described with reference to apparatus diagrams, system diagrams, and flowcharts that relate to conveying presence of enhanced paging mechanism.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may transmit, within system information, a paging mechanism indication identifying one or more paging mechanisms supported by a network. The base station 105 may transmit a paging grant in accordance with one of the one or more paging mechanisms supported by the network. The base station 105 may transmit a paging message to a UE 115 in accordance with the one of the one or more paging mechanisms supported by the network.

A UE 115 may receive, via system information, a paging mechanism indication identifying one or more paging mechanisms supported by a network. The UE 115 may receive a paging grant in accordance with one of the one or more paging mechanisms supported by the network. The UE 115 may receive a paging message in accordance with the one of the one or more paging mechanisms supported by the network.

A base station 105 may scramble, using a P-RNTI, at least a portion of a paging grant, wherein the P-RNTI is a function of a paging mechanism supported by a network. The base station 105 may transmit the paging grant in accordance with the paging mechanism supported by the network. The base station 105 may transmit a paging message to a UE 115 in accordance with the paging mechanism supported by the network.

A UE 115 may receive a paging grant, wherein at least a portion of the paging grant is scrambled using a P-RNTI that is a function of a paging mechanism supported by a network. The UE 115 may unscramble the at least a portion of the paging grant using the P-RNTI. The UE 115 may receive a paging message in accordance with the paging mechanism supported by the network.

Figure 2A:
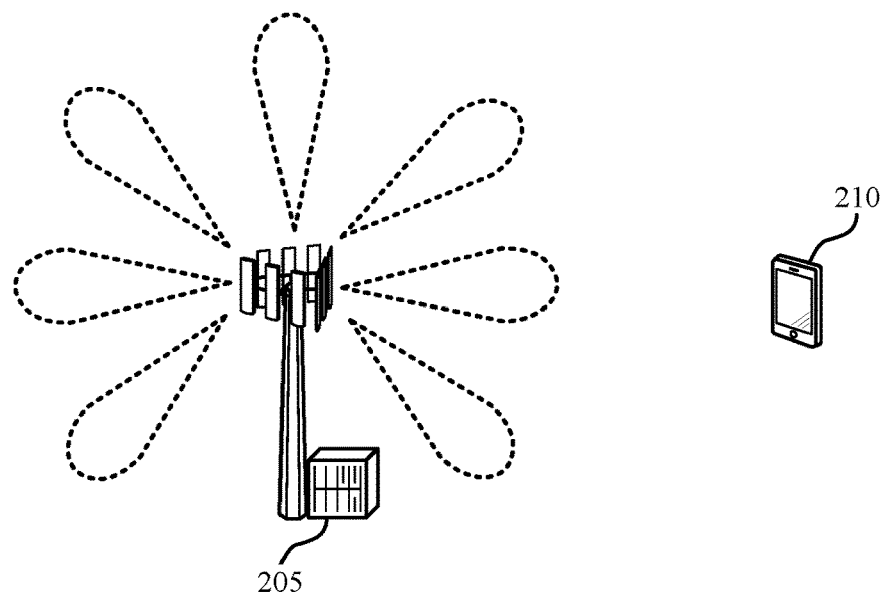
FIGS. 2A and 2B illustrate examples of a wireless communication system that supports conveying presence of enhanced paging mechanism in accordance with aspects of the present disclosure.
Figure 2A:
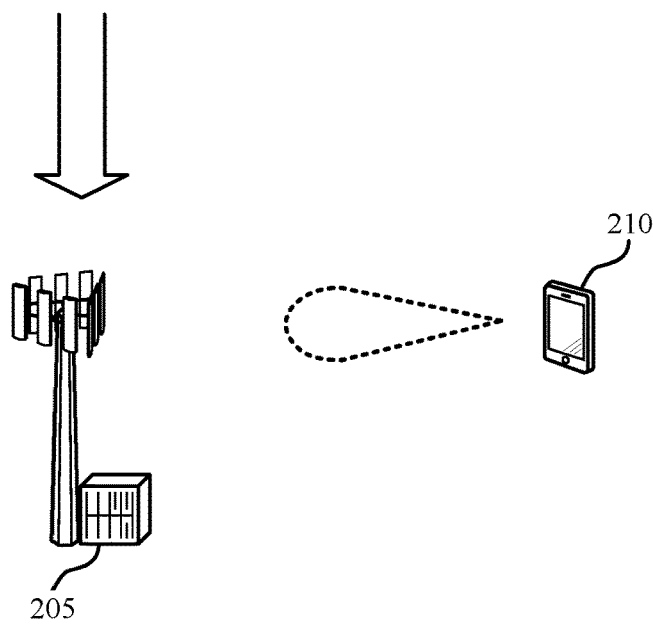
Figure 2B:
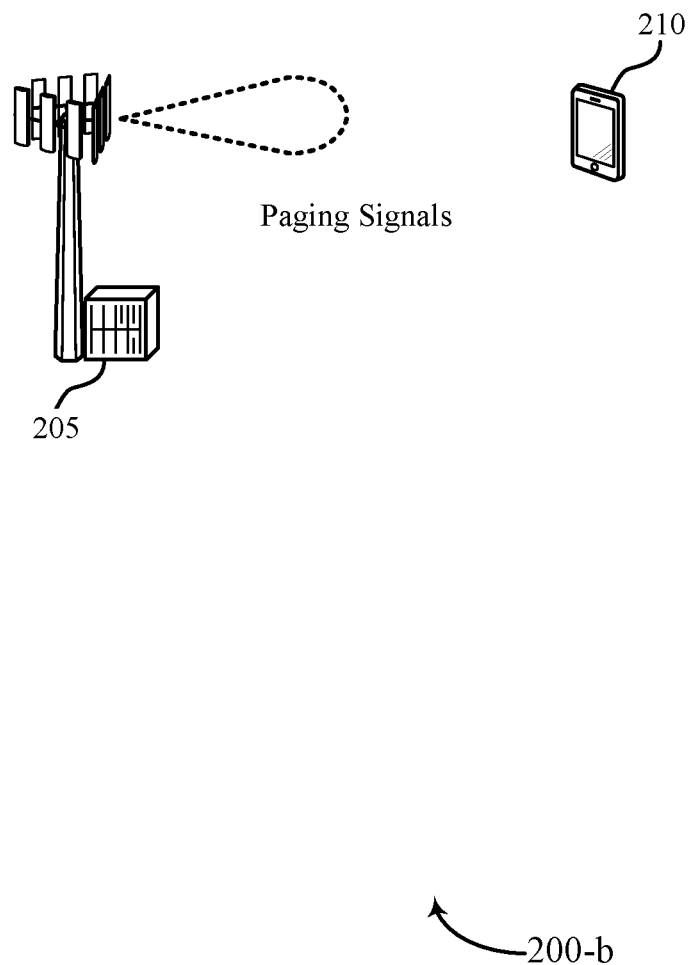

FIGS. 2A and 2B illustrate examples of a wireless communication system 200 that supports conveying presence of enhanced paging mechanism in accordance with various aspects of the present disclosure. In some examples, wireless communication system 200 may implement aspects of wireless communication system 100. Wireless communication system 200 may include a base station 205 and a UE 210, which may be examples of the corresponding devices described herein. Broadly, wireless communication system 200 illustrates one example of communicating an index of a paging mechanism in a mmW wireless communication system.

Generally, base station 205 and UE 210 may support paging using one or more paging mechanisms. As one example of a traditional paging mechanism, such as is supported in the "3rd Generation Partnership Project" (3GPP) R15, the paging mechanism may include the UE 210 operating in a DRX mode and periodically transitioning to an On Duration to monitor for paging signals from base station 205. When base station 205 pages UE 210, it may transmit a paging grant during the appropriate time. The paging grant may be transmitted in a PDCCH signal and may identify PDSCH resources that are to be used for transmission of the paging message. The UE 210 may receive the paging grant, identify the PDSCH resources, and receive the paging message accordingly.

Other examples of paging mechanisms may be considered enhanced paging mechanisms (e.g., in that they are adopted after R15). One example of an enhanced paging mechanism may support provision of a paging response between transmissions of a paging indication and paging information. For example, base station 205 and UE 210 may utilize directional transmissions during a paging procedure. In some cases, the base station 205 may transmit a paging indication (e.g., a paging notification) to one or more UEs by sweeping through a set of beams, and thus may provide to the one or more UEs an indication of uplink transmission resources allocated for paging responses. A UE that receives a paging indication may transmit a paging response to the base station on at least one of the uplink transmission resources allocated for the paging responses as identified in the paging indication. The paging response may be transmitted on a beam. The base station may receive paging responses from one or more of the UEs using a beam sweep, and may then transmit paging information to a UE on a beam on which the UE's paging response was received at the base station. The paging information may include the paging grant and paging message, as is discussed above.

Another example of an enhanced paging mechanism may use a first PDCCH along with a second PDCCH to provide control for paging messages. The first PDCCH may be formatted to carry only binary paging indicators (PIs). Each PI can be associated with one or several UEs in a paging group associated with this PDCCH transmission, for example, identified by the time-hashing and masking of the CRC. Additionally, the first PDCCH can be CRC masked with the paging group identifier (ID). A fixed association from the first PDCCH to the second PDCCH may be provided. Thus, from the reception of the first PDCCH, the UEs associated whose PIs can ascertain where to find the second PDCCH. For example, the time-frequency location of the second PDCCH can be either in the same subframe as the first PDCCH or in a different one. Moreover, the second PDCCH can be formatted as a "regular" PDCCH (that is, a PDCCH as already specified in the appropriate Specifications) with DL assignments for single codeword transmission. Thus, the second PDCCH will include such information as resource allocation of PDSCH, transport format indication, hopping flag, and other data. Additionally, the second PDCCH can be CRC masked with the paging group ID in a manner similar to that for the first PDCCH. The association from the second PDCCH to PDSCH can be provided according to the association already specified in the appropriate Specifications. With this arrangement, PDSCH carries the paging messages for all UEs indicated by the PIs in the first PDCCH, and PDSCH is transmitted according to the resources allocated in the format indicated by second PDCCH. This may provide multiple levels of UE grouping for paging.

It is to be understood that the described techniques are not limited to the above-described paging mechanisms and that other paging mechanisms may also be used.

In some aspects, UE 210 may support some, but not all of the paging mechanisms that base station 205 supports. In some aspects, UE 210 may support all of the paging mechanisms that base station 205 supports. Base station 205 may be configured to provide an indication of the paging mechanism(s) that are supported by the network (e.g., by base stations and/or UEs configured to communicate on the network, such as base station 205 and UE 210). The indication of the paging mechanism may be carried or otherwise indicated using a system information and/or based on a P-RNTI.

In one example, the base station 205 may use one or more bits of a system information to carry or otherwise convey the indication of the paging mechanism. Examples of the system information include, but are not limited to, a MIB, a RMSI, a broadcast OSI, and the like. In some aspects, one bit in the system information may be used to convey the indication of the paging mechanism. For example, the single bit may indicate whether the paging mechanism is a traditional paging mechanism (e.g., a R15 paging mechanism) or an enhanced paging mechanism. In some aspects, one or more bits in the system information may be used to convey the indication of the paging mechanism. For example, a first bit configuration (e.g., 00) may indicate a traditional paging mechanism, a second bit configuration (e.g., 01) may indicate a first enhanced paging mechanism, a third bit configuration (e.g., 10) may indicate a third enhanced paging mechanism, and so on. In some aspects, the number of bits in the system information used to convey the indication of the paging mechanism may be determined based on the number of paging mechanisms supported by the network.

In some aspects, the indication of the paging mechanism may be communicated in a different manner than the paging grant and paging message. As one example, the paging mechanism indication may be communicated in a different frequency band than the paging signals, e.g., the paging mechanism indication may be communicated in a sub-6 GHz band whereas the paging signals are communicated in a mmW band, or vice versa. As another example, the paging mechanism indication may be communicated in a different radio access technology (RAT) than the paging signals, e.g., the paging mechanism indication may be communicated in an LTE/LTE-A RAT and the paging signals may be communicated in NR RAT. As another example, the paging mechanism indication may be communicated using a different component carrier than the paging signals.

In some aspects, the paging mechanism indication may be communicated in a handover message, in an RRC signal, in a MAC CE, in a DCI, and the like.

In another example, the base station 205 may use a P-RNTI to convey the indication of the paging mechanism. Conventionally, one P-RNTI may be used for paging events. However, aspects of the described techniques may provide for additional P-RNTIs and that each P-RNTI corresponds to a unique paging mechanism. For example, base station 205 may select a P-RNTI based on the paging mechanism. The base station 205 may scramble some or all of the paging grant using the P-RNTI. In some aspects, this may include base station 205 scrambling some or all of the CRC portion of the paging grant. In some aspects, a first P-RNTI may provide an indication of whether the base station 205 supports a traditional paging mechanism or one or more enhanced paging mechanisms. In some aspects, individual P-RNTIs may each be associated with a corresponding paging mechanism. The base station 205 may transmit the scrambled P-RNTI to UE 210 and UE 210 may attempt to descramble the paging grant using one or more P-RNTIs. When the UE 210 successfully descrambles the paging grant using the appropriate P-RNTI, the UE 210 may therefore be able to identify the paging mechanism. Thus, the UE 210 may identify the resources indicated in the paging grant and receive the paging message transmitted from base station 205 using those resources.

In some aspects, the base station 205 may provide an indication of the relationship between the P-RNTI and the paging mechanism in a system information message, such as a MIB, RMSI, broadcast OSI, and the like. In some aspects, the base station 205 may provide the indication of the relationship between the P-RNTI and the paging mechanism in other signals, e.g., in a RRC signal, as part of handover signaling, in a MAC CE, in a DCI, and the like. In some aspects, the base station 205 may provide the indication of the relationship between the P-RNTI and the paging mechanism and the actual paging signals in different frequency bands (e.g., sub-6 GHz vs mmW bands), in different RATs, using different component carriers, and the like.

In some aspects, the indication of the paging mechanism may be communicated once (e.g., during initial connection establishment), may be communicated according to a periodic schedule, and/or may be communicated as needed (e.g., whenever there is a change in the paging mechanism).

Referring to FIG. 2A, illustrated therein is one example of a paging mechanism using aspects of the described techniques wherein the wireless communication system is a mmW network. Initially, base station 205 may transmit an indication of a paging mechanism (e.g., using any of the described techniques). For example, the transmission of the indication of the paging mechanism may include transmitting a one-bit indication within system information (for example, in an MIB, an RMSI, or a broadcast OSI). In another example, the supported paging mechanism may be conveyed by use of a specific P-RNTI that is determined as a function of supported paging mechanism. In one example, the specific P-RNTI may be used to scramble a CRC of a paging grant. In either example, the UE 210 is able to identify the supported paging mechanism. In FIG. 2A, the base station 205 is engaged in a paging occasion using one of the potential supported paging mechanisms. In the illustrated supported mechanism, base station 205 may transmit a paging indication in a plurality of different directions (e.g., using different transmit beams). In some aspects, this may include organizing UEs into a group of UEs and transmitting the paging indication in a plurality of directions using different transmit beams. Next, UE 210 may respond by transmitting a beam indication that identifies transmit beam(s) on which the UE 210 received the paging indication. Referring to FIG. 2B, the base station 205 may transmit the paging signals (e.g., the paging grant and paging message) on the transmit beam(s) that correspond to the beam indication received from UE 210.

Other example paging mechanisms could be shown, as already explained herein. In each case, the base station 205 may indicate to the UE 210 the type of paging mechanism supported.

Thus, aspects of the described techniques provide multiple examples of indicating a paging mechanism to a UE. In a first example, base station 205 may use one bit in either MIB or RMSI or broadcast OSI to convey this information indicating the paging mechanism. An advantage of the first example includes the UE 210 will have to decode MIB, RMSI and possibly broadcast OSI to receive paging message (RRC message or handover report may also be used to convey the indication of the paging mechanism). When those channels convey this information, UE 210 will know whether it can support the current working paging mechanism before trying to decode paging DCI. This will save power at the UE 210. A disadvantage of this example is that it may increase MIB/RMSI/broadcast OSI by 1 bit. Every broadcast bit is costly in millimeter wave. In some aspects, the MIB may be transmitted via PBCH. In some aspects, both RMSI and broadcast OSI may be scheduled by PDCCH and conveyed via PDSCH.

In a second example, base station 205 may use different P-RNTI to convey the use of different paging mechanisms. Base station 205 scrambles paging PDCCH's CRC with P-RNTI. Before decoding paging DCI, UE will check if the CRC passes. If the use of enhanced paging mechanism is conveyed via P-RNTI, CRC of paging PDCCH will not pass for R15 UEs and it will not have to lose power to decode every bit of paging PDCCH. Aspects of this example may use more power than the MIB/RMSI/OSI based indication. However, it does not require base station 205 to transmit additional bit(s) towards every direction. Conventionally, P-RNTI is a fixed number, e.g., 65334 (0Xfffe). With this method, P-RNTI will be a function of the paging mechanism. The relationship between P-RNTI and paging mechanism can be fixed and written in the specification. One scenario would be to convey this relationship through MIB, RMSI or broadcast OSI.

In a third example, base station 205 may use a combination of paging DCI, P-RNTI and system information (MIB, RMSI, broadcast OSI) to take advantage of the tradeoff among these different examples. If there are four possible paging mechanism options, 1 bit could be sent via DCI and another could be sent via system information. As another approach, 1 bit could be sent via system information (SI) and the remaining two choices can be differentiated via paging RNTI.

In a fourth example, the paging mechanism can be implicitly indicated through other paging related information like DRX cycle, periodicity of paging frame and occasion, the band and beam sweep info (e.g. number of synchronization signal blocks (SSBs)), etc. For example, in higher band, always use enhanced mechanism to reduce overhead. If the number of actually transmitted SSBs is greater than a specified number, a configured UE assumes enhanced paging mechanism operation.

Figure 3:
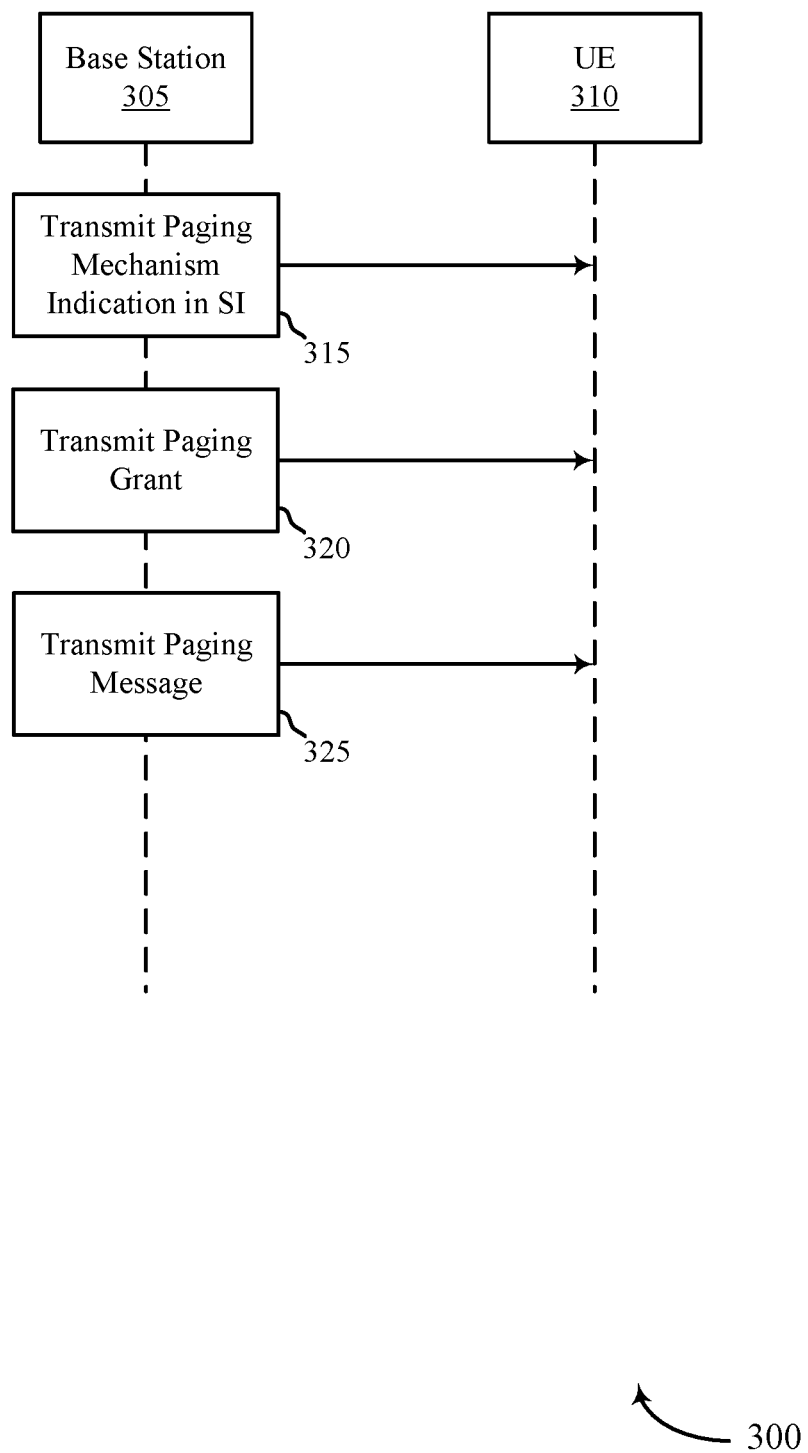
FIG. 3 illustrates an example of a process that supports conveying presence of enhanced paging mechanism in accordance with aspects of the present disclosure.

FIG. 3 illustrates an example of a process 300 that supports conveying presence of enhanced paging mechanism in accordance with various aspects of the present disclosure. In some examples, process 300 may implement aspects of wireless communication systems 100/200. Process 300 may include a base station 305 and a UE 310, which may be examples of the corresponding devices described herein.

At 315, base station 305 may transmit (and UE 310 may receive) the paging mechanism indication in a system information. The indication may identify paging mechanism(s) supported by a network. In some aspects, the system information may include one or more of a MIB, a RMSI, a broadcast OSI, and the like. In some aspects, the paging mechanism indication may be a single bit indication. In some aspects, the paging mechanism indication may provide an indication of whether the network supports a first paging mechanism (e.g., a traditional paging mechanism) or one or more enhanced paging mechanisms.

In some aspects, this may include base station 305 organizing the UE into a first group of a plurality of groups of UEs and transmitting the paging indication to the UEs in the first group of UEs in a plurality of directions corresponding to a plurality of transmit beams. In some aspects, this may include transmitting an indication that the UEs are organized in the first group.

At 320, base station 305 may transmit (and UE 310 may receive) the paging grant in accordance with the paging mechanism(s) supported by the network.

At 325, base station 305 may transmit (and UE 310 may receive) the paging message in accordance with the paging mechanism(s) supported by the network.

Figure 4:
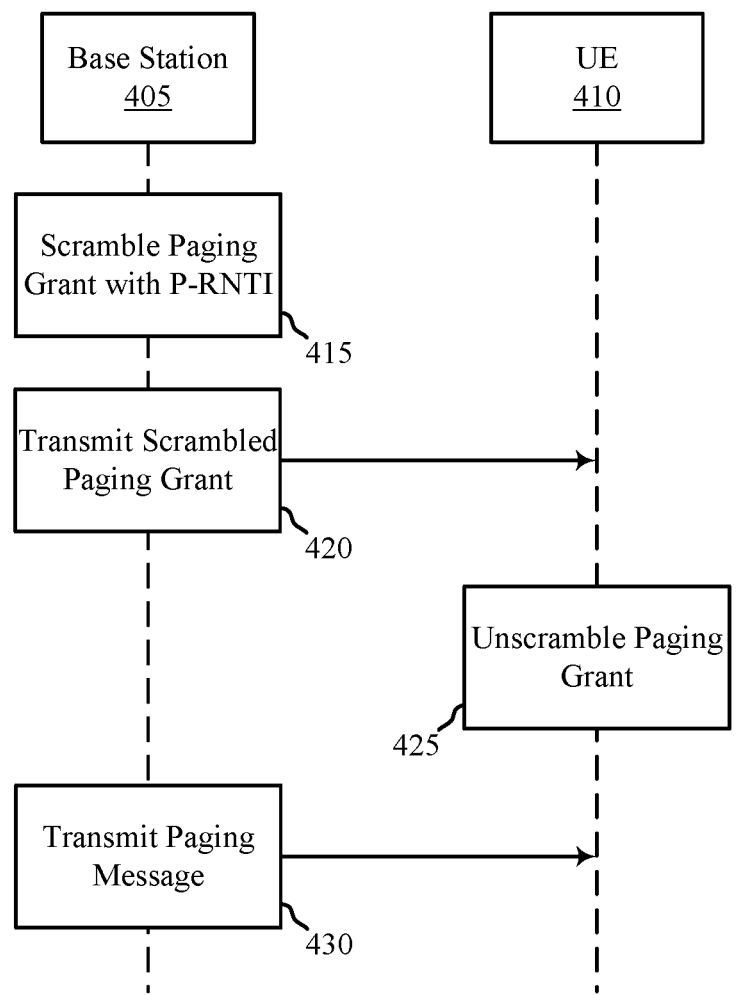
FIG. 4 illustrates an example of a process that supports conveying presence of enhanced paging mechanism in accordance with aspects of the present disclosure.

FIG. 4 illustrates an example of a process 400 that supports conveying presence of enhanced paging mechanism in accordance with various aspects of the present disclosure. In some examples, process 400 may implement aspects of wireless communication systems 100/200 and/or process 300.

At 415, base station 405 may scramble, using a P-RNTI, at least a portion of a paging grant. The P-RNTI may be a function of a paging mechanism supported by the network. In some aspects, this may include scrambling a CRC portion of the paging grant using the P-RNTI. In some aspects, the P-RNTI may be a function of whether the network supports a first paging mechanism or any of a plurality of enhanced paging mechanisms. In some aspects, the relationship between the P-RNTI and the paging mechanism(s) supported by the network may be predefined. In some aspects (not shown), base station 405 may provide an indication to UE 410 of the relationship between the P-RNTI and the paging mechanism(s) supported by the network prior to transmitting the paging grant.

At 420, base station 405 may transmit (and UE 410 may receive) the paging grant in accordance with the paging mechanism supported by the network.

At 425, UE 410 may descramble (or unscramble) the at least a portion of the paging grant using the P-RNTI.

At 430, base station 405 may transmit (and UE 410 may receive) the paging message in accordance with the paging mechanism supported by the network.

In some aspects, this may include organizing the UE into a first group of a plurality of groups of UEs and transmitting, in a plurality of directions corresponding to a plurality of transmit beams, a paging indication to UEs in the first group.

The base station 405 may receive, from the UE 410 and in response to the paging indication, a beam indication identifying one or more transmit beams of the plurality of transmit beams on which the UE received the paging indication. In some aspects, this may include transmitting the paging grant on the one or more transmit beams corresponding to the beam indication. In some aspects, this may include transmitting the paging message to the UE 410 on the one or more transmit beams corresponding to the beam indication.

In some aspects, this may include organizing the UE 410 into a first group of a plurality of groups of UEs and transmitting, in a paging indication to UEs in the first group, an indication that the UEs are organized in the first group. In some aspects, this may include including a paging index in the paging grant, indicating that the paging grant is for the UEs of the first group.

Figure 5:
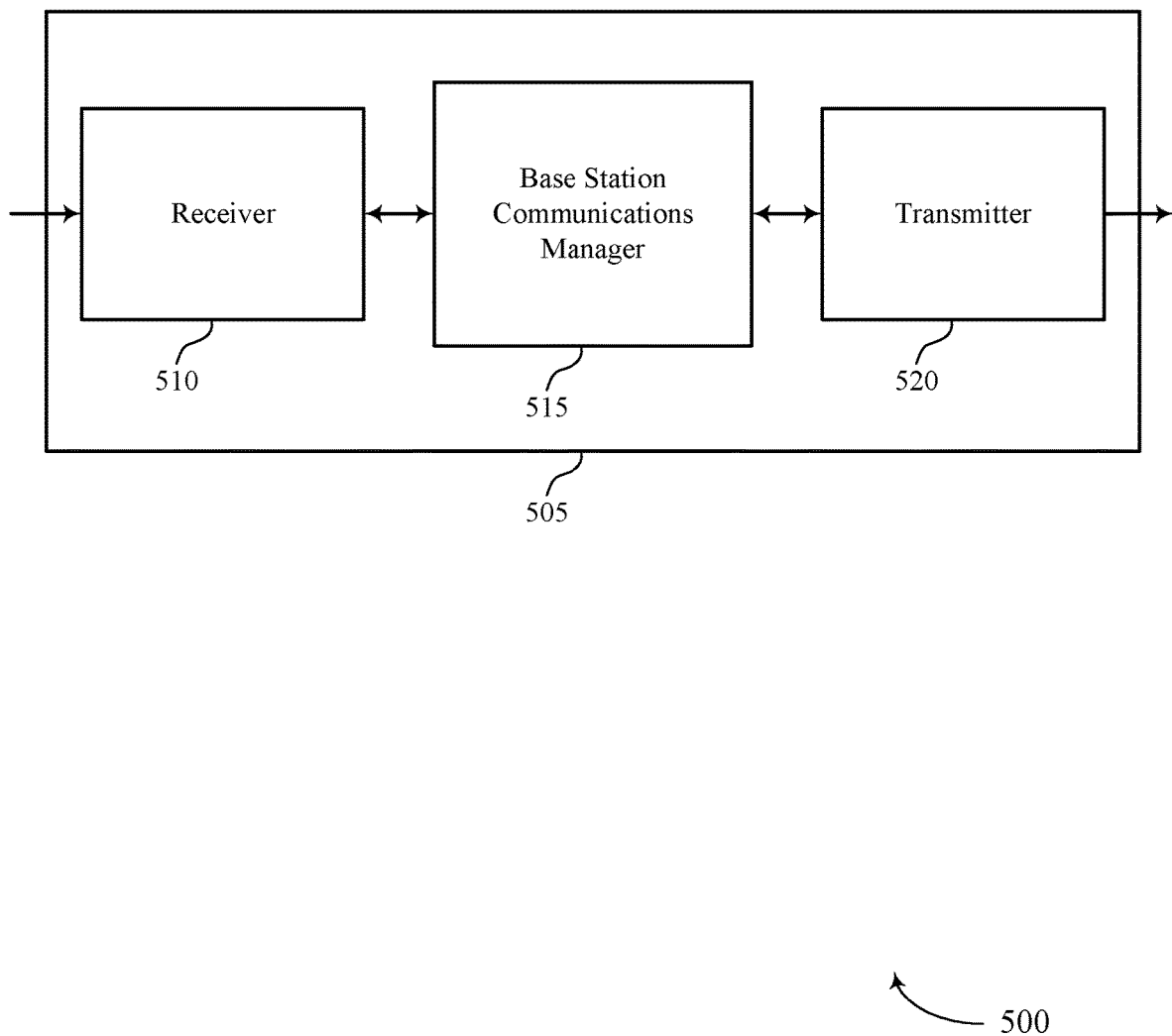
FIGS. 5 through 7 show block diagrams of a device that supports conveying presence of enhanced paging mechanism in accordance with aspects of the present disclosure.

FIG. 5 shows a block diagram 500 of a wireless device 505 that supports conveying presence of enhanced paging mechanism in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to conveying presence of enhanced paging mechanism, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may transmit, within system information, a paging mechanism indication identifying one or more paging mechanisms supported by a network, transmit a paging grant in accordance with one of the one or more paging mechanisms supported by the network, and transmit a paging message to a UE in accordance with the one of the one or more paging mechanisms supported by the network. The base station communications manager 515 may also scramble, using a P-RNTI, at least a portion of a paging grant, where the P-RNTI is a function of a paging mechanism supported by a network, transmit the paging grant in accordance with the paging mechanism supported by the network, and transmit a paging message to a UE in accordance with the paging mechanism supported by the network.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
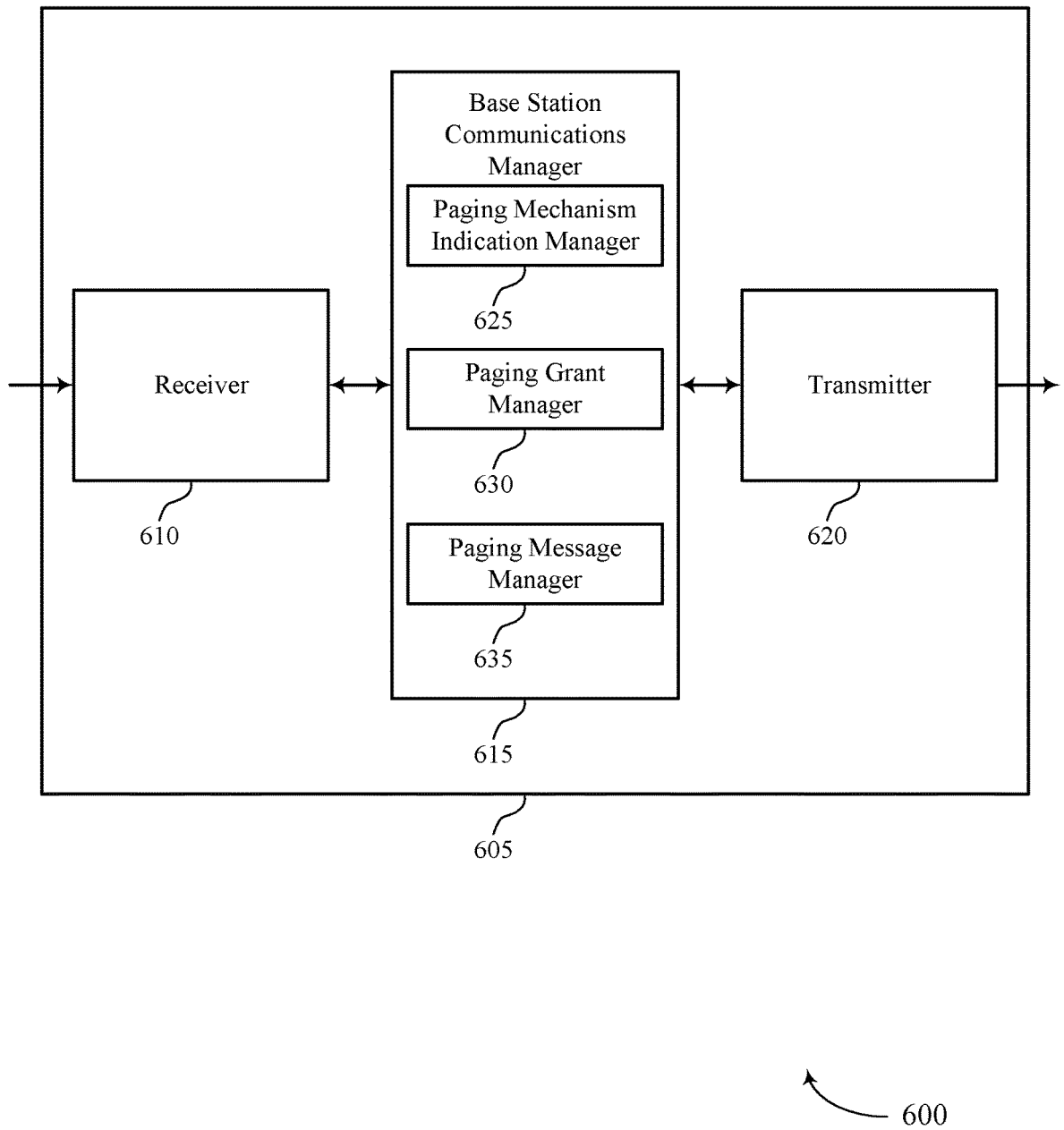

FIG. 6 shows a block diagram 600 of a wireless device 605 that supports conveying presence of enhanced paging mechanism in accordance with aspects of the present disclosure. Wireless device 605 may be an example of aspects of a wireless device 505 or a base station 105 as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to conveying presence of enhanced paging mechanism, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8.

Base station communications manager 615 may also include paging mechanism indication manager 625, paging grant manager 630, and paging message manager 635.

Paging mechanism indication manager 625 may transmit, within system information, a paging mechanism indication identifying one or more paging mechanisms supported by a network, indicate to the UE a relationship between the P-RNTI and the paging mechanism supported by the network in advance of transmitting the paging grant, and scramble, using a P-RNTI, at least a portion of a paging grant, where the P-RNTI is a function of a paging mechanism supported by a network. In some cases, indicating the relationship between the P-RNTI and the paging mechanism supported by the network includes transmitting an indication of the relationship in system information. In some cases, transmitting the paging mechanism indication includes transmitting the paging mechanism indication via RMSI. In some cases, transmitting the paging mechanism indication includes transmitting the paging mechanism indication via broadcast OSI. In some cases, the paging mechanism indication is a one-bit indication. In some cases, the paging mechanism indication identifies whether the network supports a first paging mechanism or any of a set of enhanced paging mechanisms. In some cases, transmitting the paging mechanism indication includes transmitting the paging mechanism indication via a MIB. In some cases, scrambling the at least a portion of the paging grant includes scrambling a CRC portion of the paging grant using the P-RNTI. In some cases, the P-RNTI is a function of whether the network supports a first paging mechanism or any of a set of enhanced paging mechanisms. In some cases, a relationship between the P-RNTI and the paging mechanism supported by the network is predefined.

Paging grant manager 630 may transmit a paging grant in accordance with one of the one or more paging mechanisms supported by the network and transmit the paging grant in accordance with the paging mechanism supported by the network.

Paging message manager 635 may transmit a paging message to a UE in accordance with the one of the one or more paging mechanisms supported by the network and transmit a paging message to a UE in accordance with the paging mechanism supported by the network.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
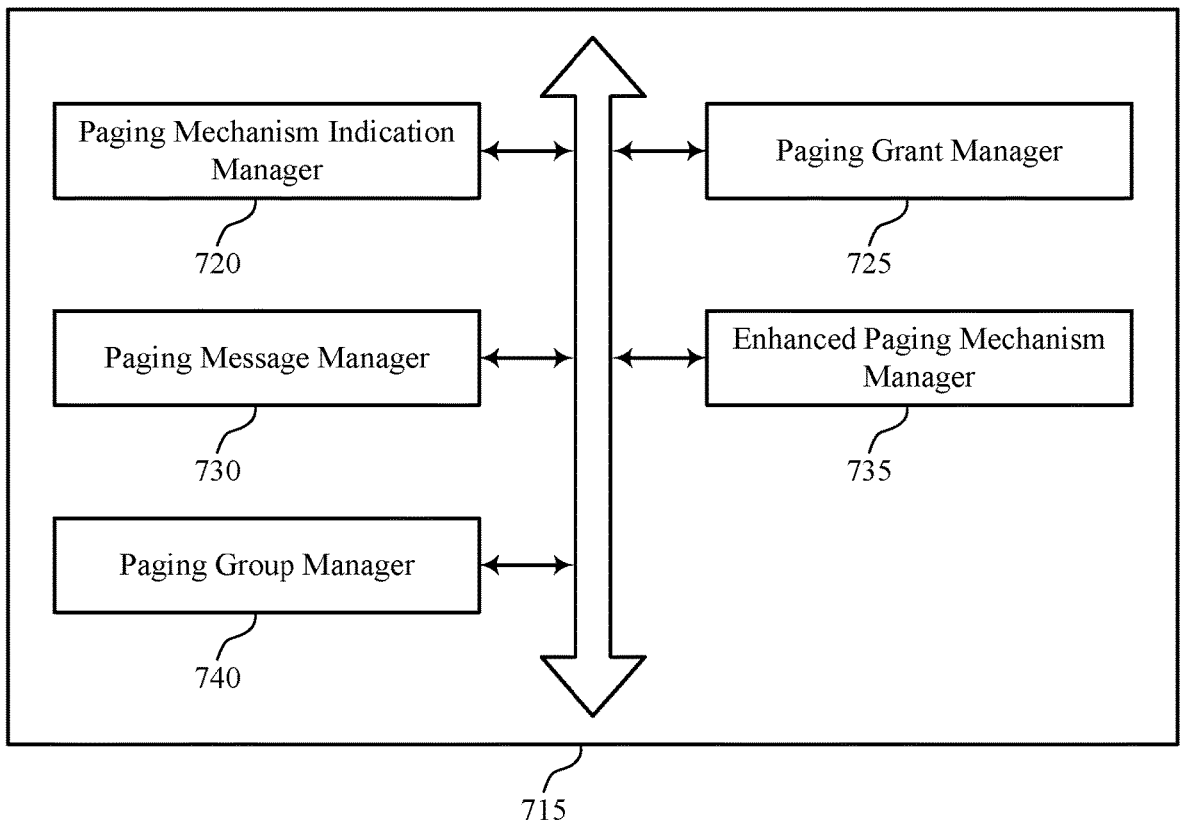

FIG. 7 shows a block diagram 700 of a base station communications manager 715 that supports conveying presence of enhanced paging mechanism in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include paging mechanism indication manager 720, paging grant manager 725, paging message manager 730, enhanced paging mechanism manager 735, and paging group manager 740. Each of these modules may communicate, directly or indirectly, with one another (e.g., via one or more buses).

Paging mechanism indication manager 720 may transmit, within system information, a paging mechanism indication identifying one or more paging mechanisms supported by a network, indicate to the UE a relationship between the P-RNTI and the paging mechanism supported by the network in advance of transmitting the paging grant, and scramble, using a P-RNTI, at least a portion of a paging grant, where the P-RNTI is a function of a paging mechanism supported by a network. In some cases, indicating the relationship between the P-RNTI and the paging mechanism supported by the network includes transmitting an indication of the relationship in system information. In some cases, transmitting the paging mechanism indication includes transmitting the paging mechanism indication via RMSI. In some cases, transmitting the paging mechanism indication includes transmitting the paging mechanism indication via broadcast OSI. In some cases, the paging mechanism indication is a one-bit indication. In some cases, the paging mechanism indication identifies whether the network supports a first paging mechanism or any of a set of enhanced paging mechanisms. In some cases, transmitting the paging mechanism indication includes transmitting the paging mechanism indication via a MIB. In some cases, scrambling the at least a portion of the paging grant includes scrambling a CRC portion of the paging grant using the P-RNTI. In some cases, the P-RNTI is a function of whether the network supports a first paging mechanism or any of a set of enhanced paging mechanisms. In some cases, a relationship between the P-RNTI and the paging mechanism supported by the network is predefined.

Paging grant manager 725 may transmit a paging grant in accordance with one of the one or more paging mechanisms supported by the network and transmit the paging grant in accordance with the paging mechanism supported by the network.

Paging message manager 730 may transmit a paging message to a UE in accordance with the one of the one or more paging mechanisms supported by the network and transmit a paging message to a UE in accordance with the paging mechanism supported by the network.

Enhanced paging mechanism manager 735 may organize the UE into a first group of a set of groups of UEs, transmit, in a set of directions corresponding to a set of transmit beams, a paging indication to UEs in the first group, and receive, from the UE and in response to the paging indication, a beam indication identifying one or more transmit beams of the set of transmit beams on which the UE received the paging indication. In some cases, transmitting the paging grant in accordance with one of the one or more paging mechanisms supported by the network includes transmitting the paging grant on the one or more transmit beams corresponding to the beam indication. In some cases, transmitting the paging message to the UE in accordance with the one of the one or more paging mechanisms supported by the network includes transmitting the paging message to the UE on the one or more transmit beams corresponding to the beam indication. In some cases, transmitting the paging grant in accordance with one of the one or more paging mechanisms supported by the network includes transmitting the paging grant on the one or more transmit beams corresponding to the beam indication. In some cases, transmitting the paging message to the UE in accordance with the one of the one or more paging mechanisms supported by the network includes transmitting the paging message to the UE on the one or more transmit beams corresponding to the beam indication.

Paging group manager 740 may organize the UE into a first group of a set of groups of UEs and transmit, in a paging indication to UEs in the first group, an indication that the UEs are organized in the first group. In some cases, transmitting the paging grant in accordance with one of the one or more paging mechanisms supported by the network includes including a paging index in the paging grant, indicating that the paging grant is for the UEs of the first group. In some cases, transmitting the paging grant in accordance with one of the one or more paging mechanisms supported by the network includes including a paging index in the paging grant, indicating that the paging grant is for the UEs of the first group.

Figure 8:
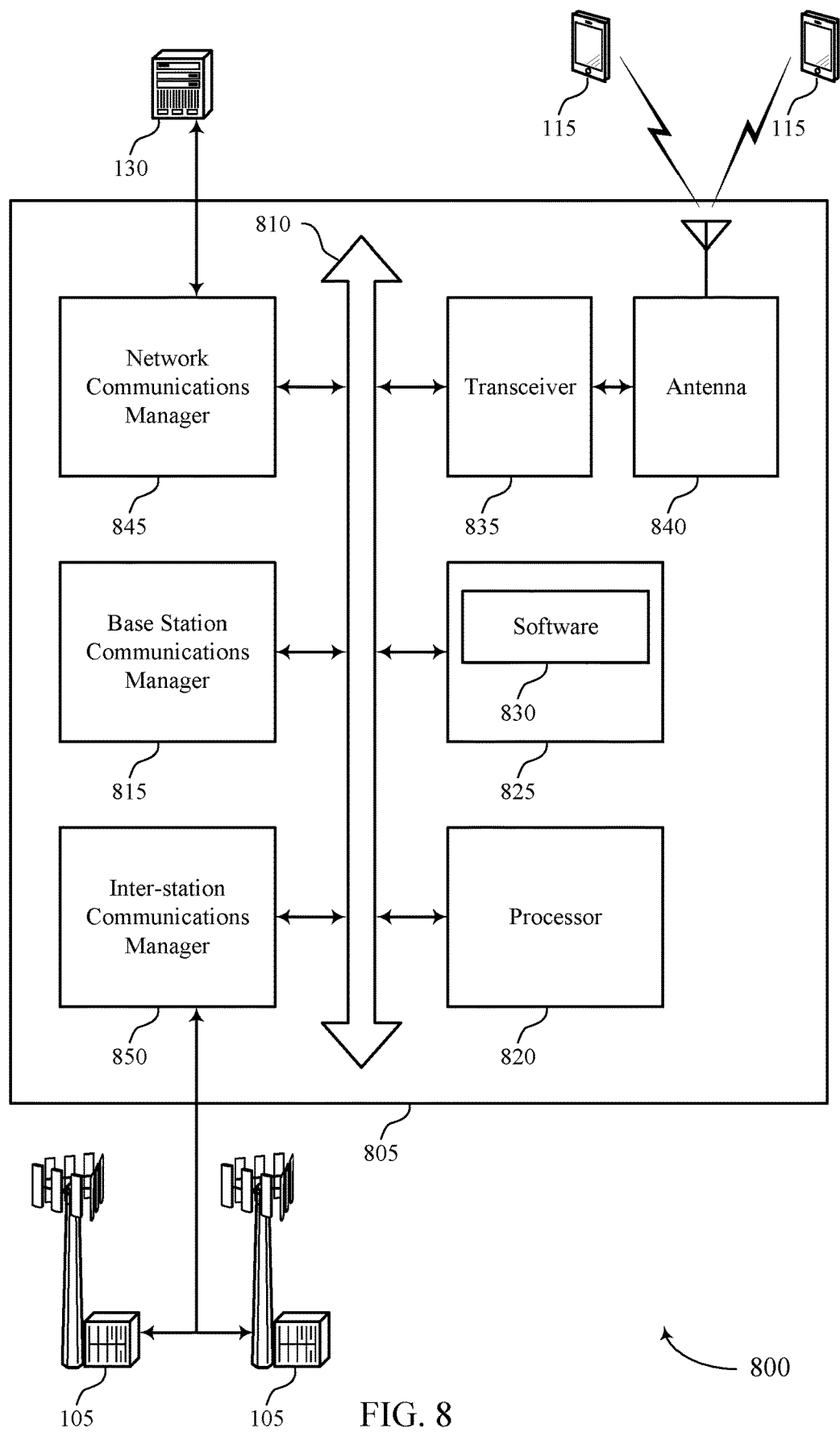
FIG. 8 illustrates a block diagram of a system including a base station that supports conveying presence of enhanced paging mechanism in accordance with aspects of the present disclosure.

FIG. 8 shows a diagram of a system 800 including a device 805 that supports conveying presence of enhanced paging mechanism in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting conveying presence of enhanced paging mechanism).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support conveying presence of enhanced paging mechanism. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
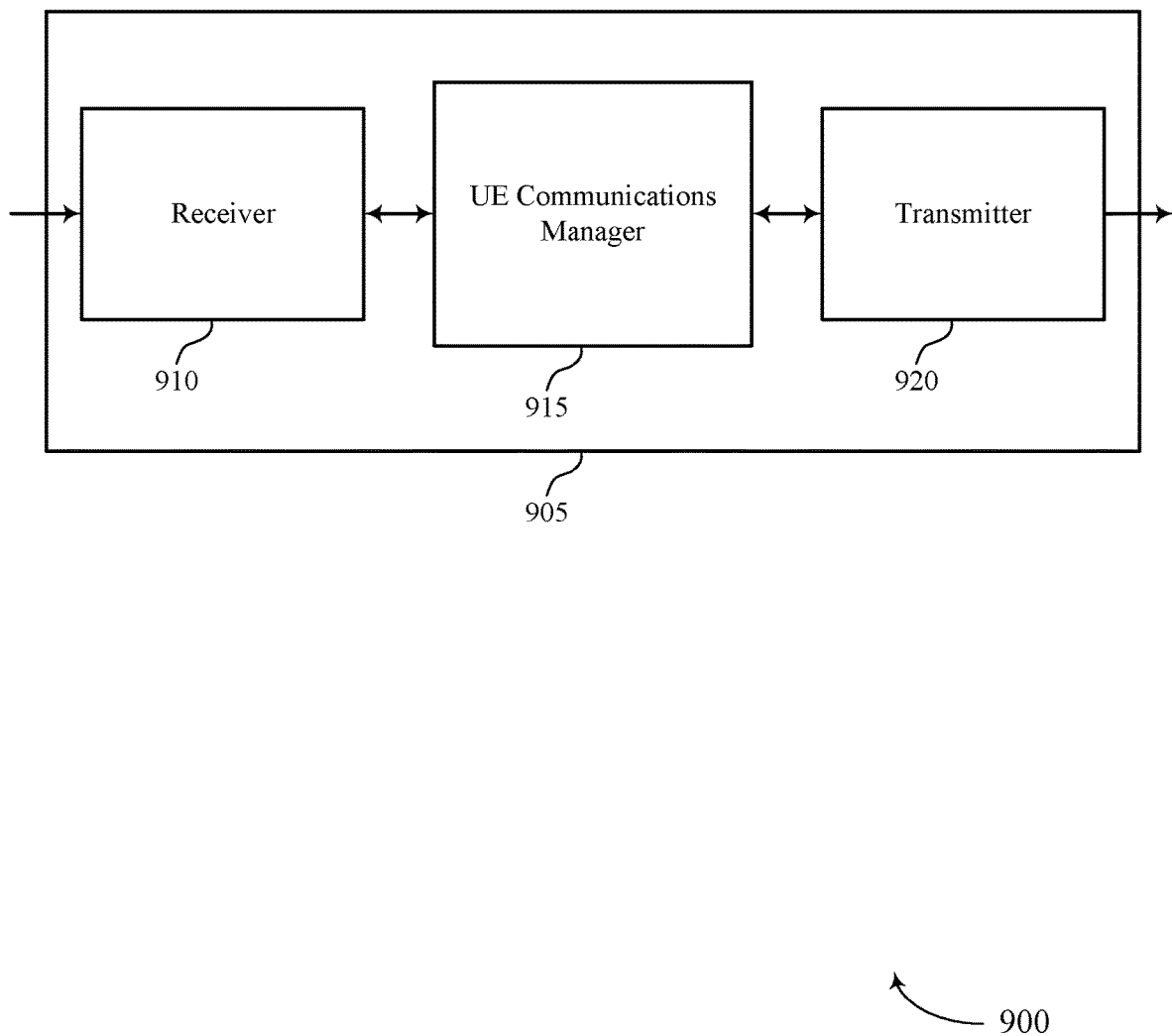
FIGS. 9 through 11 show block diagrams of a device that supports conveying presence of enhanced paging mechanism in accordance with aspects of the present disclosure.

FIG. 9 shows a block diagram 900 of a wireless device 905 that supports conveying presence of enhanced paging mechanism in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to conveying presence of enhanced paging mechanism, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, at a UE and via system information, a paging mechanism indication identifying one or more paging mechanisms supported by a network, receive, at the UE, a paging grant in accordance with one of the one or more paging mechanisms supported by the network, and receive, at the UE, a paging message in accordance with the one of the one or more paging mechanisms supported by the network. The UE communications manager 915 may also receive a paging grant, where at least a portion of the paging grant is scrambled using a P-RNTI that is a function of a paging mechanism supported by a network, unscramble the at least a portion of the paging grant using the P-RNTI, and receive a paging message in accordance with the paging mechanism supported by the network.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
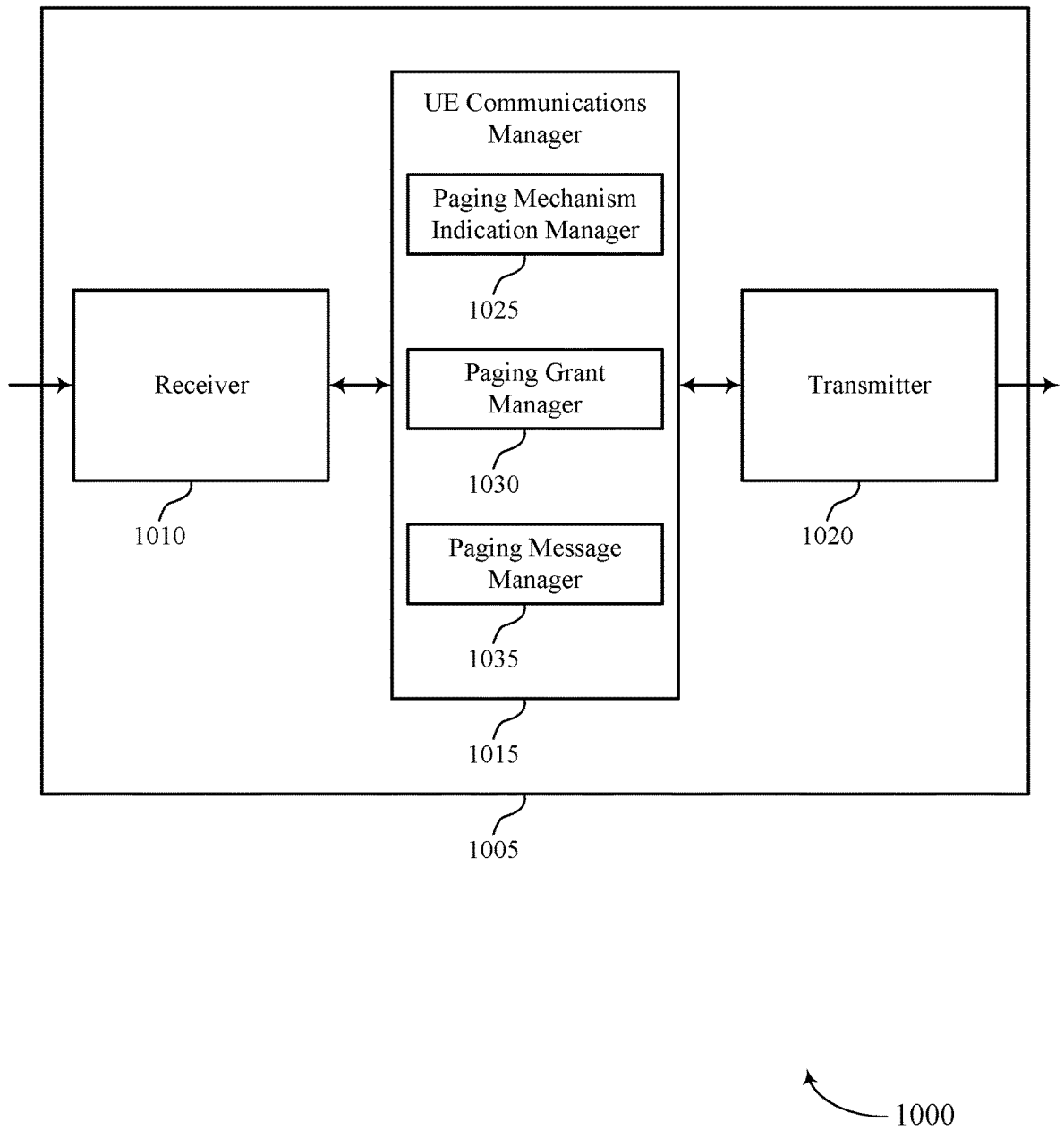

FIG. 10 shows a block diagram 1000 of a wireless device 1005 that supports conveying presence of enhanced paging mechanism in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to conveying presence of enhanced paging mechanism, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include paging mechanism indication manager 1025, paging grant manager 1030, and paging message manager 1035.

Paging mechanism indication manager 1025 may receive, at a UE and via system information, a paging mechanism indication identifying one or more paging mechanisms supported by a network, receive an indication of a relationship between the P-RNTI and the paging mechanism supported by the network in advance of receiving the paging grant, and receive a paging grant, where at least a portion of the paging grant is scrambled using a P-RNTI that is a function of a paging mechanism supported by a network. In some cases, receiving the indication of the relationship between the P-RNTI and the paging mechanism supported by the network includes receiving the indication of the relationship in system information. In some cases, receiving the paging mechanism indication includes receiving the paging mechanism indication via RMSI. In some cases, receiving the paging mechanism indication includes receiving the paging mechanism indication via broadcast OSI. In some cases, the paging mechanism indication is a one-bit indication. In some cases, the paging mechanism indication identifies whether the network supports a first paging mechanism or any of a set of enhanced paging mechanisms. In some cases, receiving the paging mechanism indication includes receiving the paging mechanism indication via a MIB. In some cases, the at least a portion of the paging grant that is scrambled using the P-RNTI is a CRC portion of the paging grant. In some cases, the P-RNTI is a function of whether the network supports a first paging mechanism or any of a set of enhanced paging mechanisms. In some cases, a relationship between the P-RNTI and the paging mechanism supported by the network is predefined.

Paging grant manager 1030 may receive, at the UE, a paging grant in accordance with one of the one or more paging mechanisms supported by the network and unscramble the at least a portion of the paging grant using the P-RNTI.

Paging message manager 1035 may receive, at the UE, a paging message in accordance with the one of the one or more paging mechanisms supported by the network and receive a paging message in accordance with the paging mechanism supported by the network.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
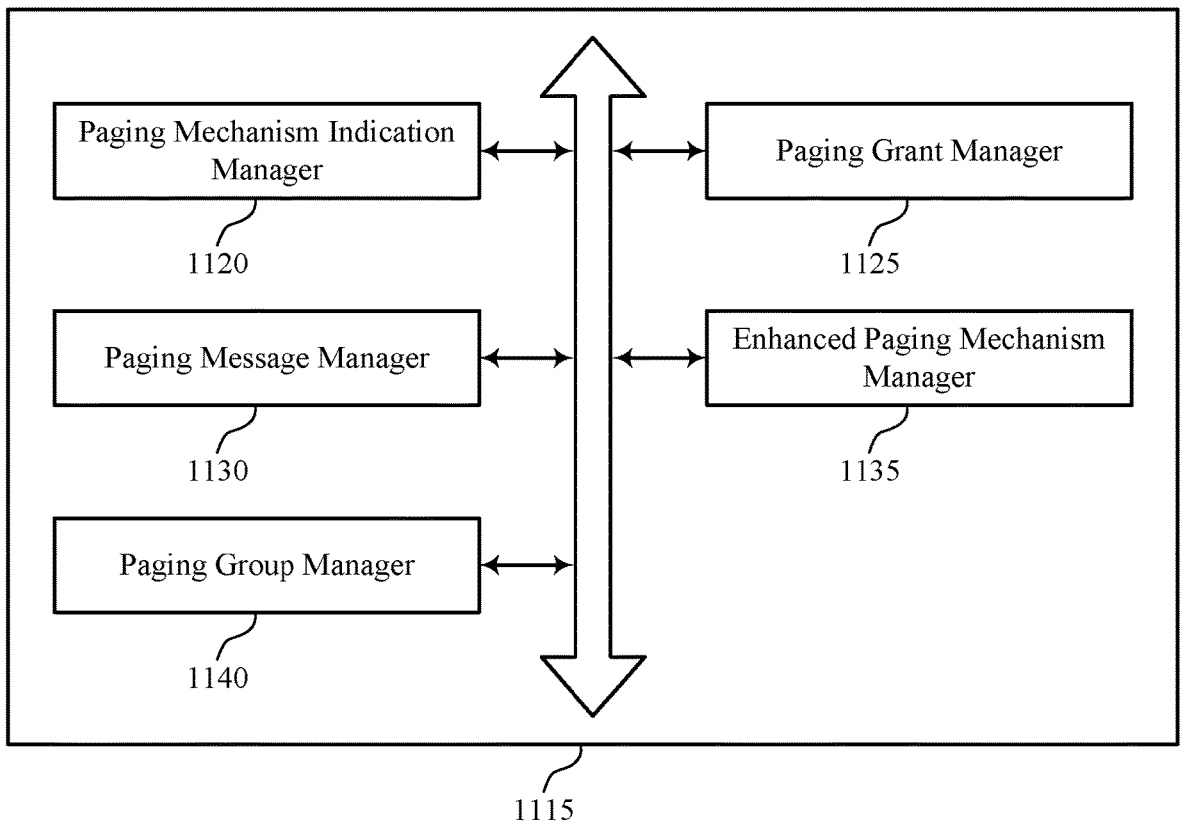

FIG. 11 shows a block diagram 1100 of a UE communications manager 1115 that supports conveying presence of enhanced paging mechanism in accordance with aspects of the present disclosure. The UE communications manager 1115 may be an example of aspects of a UE communications manager 1215 described with reference to FIGS. 9, 10, and 12. The UE communications manager 1115 may include paging mechanism indication manager 1120, paging grant manager 1125, paging message manager 1130, enhanced paging mechanism manager 1135, and paging group manager 1140. Each of these modules may communicate, directly or indirectly, with one another (e.g., via one or more buses).

Paging mechanism indication manager 1120 may receive, at a UE and via system information, a paging mechanism indication identifying one or more paging mechanisms supported by a network, receive an indication of a relationship between the P-RNTI and the paging mechanism supported by the network in advance of receiving the paging grant, and receive a paging grant, where at least a portion of the paging grant is scrambled using a P-RNTI that is a function of a paging mechanism supported by a network. In some cases, receiving the indication of the relationship between the P-RNTI and the paging mechanism supported by the network includes receiving the indication of the relationship in system information. In some cases, receiving the paging mechanism indication includes receiving the paging mechanism indication via RMSI. In some cases, receiving the paging mechanism indication includes receiving the paging mechanism indication via broadcast OSI. In some cases, the paging mechanism indication is a one-bit indication. In some cases, the paging mechanism indication identifies whether the network supports a first paging mechanism or any of a set of enhanced paging mechanisms. In some cases, receiving the paging mechanism indication includes receiving the paging mechanism indication via a MIB. In some cases, the at least a portion of the paging grant that is scrambled using the P-RNTI is a CRC portion of the paging grant. In some cases, the P-RNTI is a function of whether the network supports a first paging mechanism or any of a set of enhanced paging mechanisms. In some cases, a relationship between the P-RNTI and the paging mechanism supported by the network is predefined.

Paging grant manager 1125 may receive, at the UE, a paging grant in accordance with one of the one or more paging mechanisms supported by the network and unscramble the at least a portion of the paging grant using the P-RNTI.

Paging message manager 1130 may receive, at the UE, a paging message in accordance with the one of the one or more paging mechanisms supported by the network and receive a paging message in accordance with the paging mechanism supported by the network.

Enhanced paging mechanism manager 1135 may receive a paging indication via one or more transmit beams corresponding to different transmit directions from the network and transmit, in response to the paging indication, a beam indication identifying the one or more transmit beams of the set of transmit beams on which the UE received the paging indication. In some cases, receiving the paging grant in accordance with one of the one or more paging mechanisms supported by the network includes receiving the paging grant via at least one of the one or more transmit beams corresponding to the beam indication. In some cases, receiving the paging message in accordance with the one of the one or more paging mechanisms supported by the network includes receiving the paging message via the at least one of the one or more transmit beams corresponding to the beam indication. In some cases, receiving the paging grant in accordance with one of the one or more paging mechanisms supported by the network includes receiving the paging grant via at least one of the one or more transmit beams corresponding to the beam indication. In some cases, receiving the paging message in accordance with the one of the one or more paging mechanisms supported by the network includes receiving the paging message via the at least one of the one or more transmit beams corresponding to the beam indication.

Paging group manager 1140 may receive, in a paging indication, an indication that the UE is organized in a first group of a set of groups of UEs. In some cases, receiving the paging grant in accordance with one of the one or more paging mechanisms supported by the network includes receiving a paging index in the paging grant, indicating that the paging grant is for UEs of the first group. In some cases, receiving the paging grant in accordance with one of the one or more paging mechanisms supported by the network includes receiving a paging index in the paging grant, indicating that the paging grant is for UEs of the first group.

Figure 12:
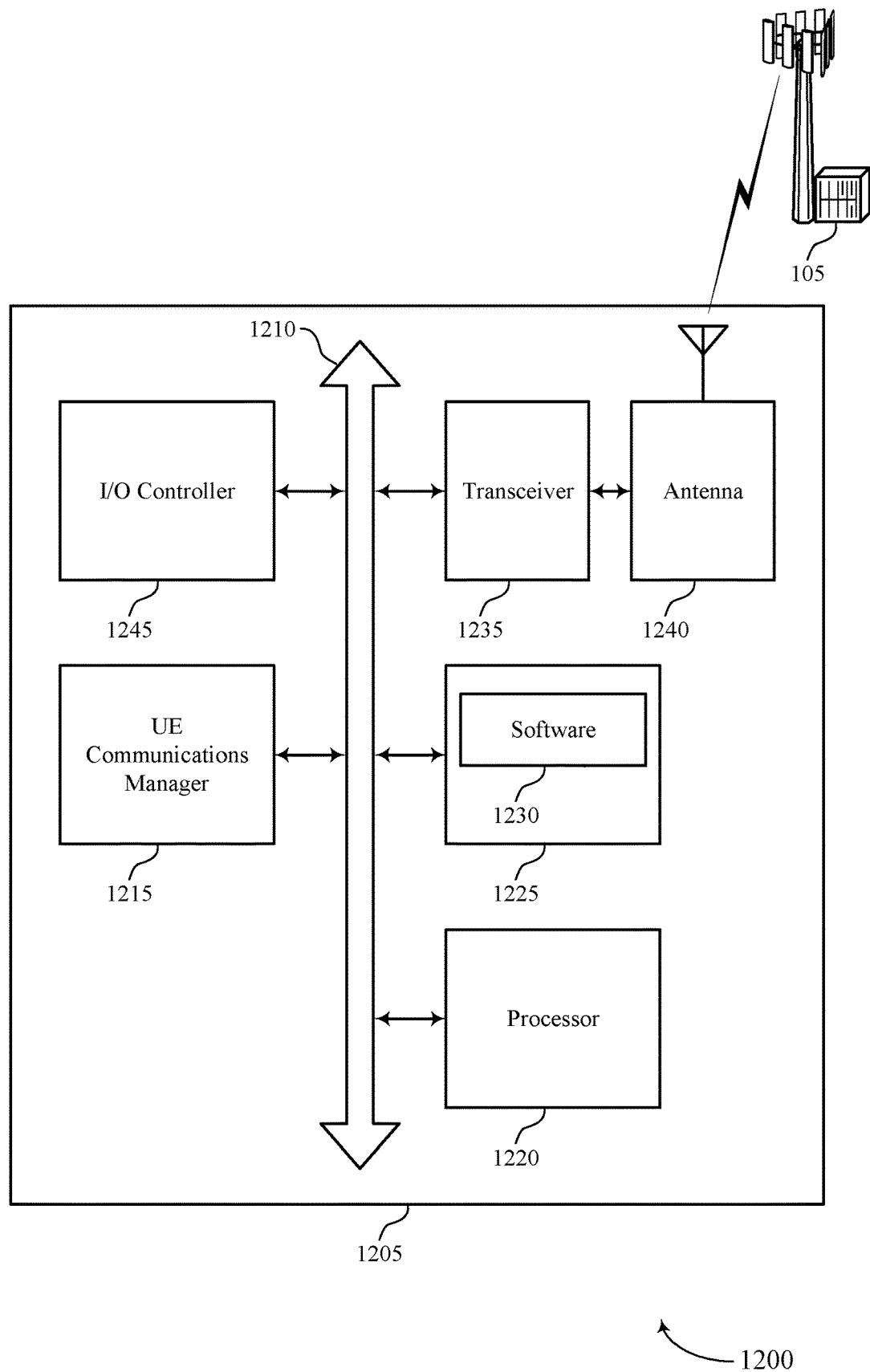
FIG. 12 illustrates a block diagram of a system including a user equipment (UE) that supports conveying presence of enhanced paging mechanism in accordance with aspects of the present disclosure.

FIG. 12 shows a diagram of a system 1200 including a device 1205 that supports conveying presence of enhanced paging mechanism in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting conveying presence of enhanced paging mechanism).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support conveying presence of enhanced paging mechanism. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
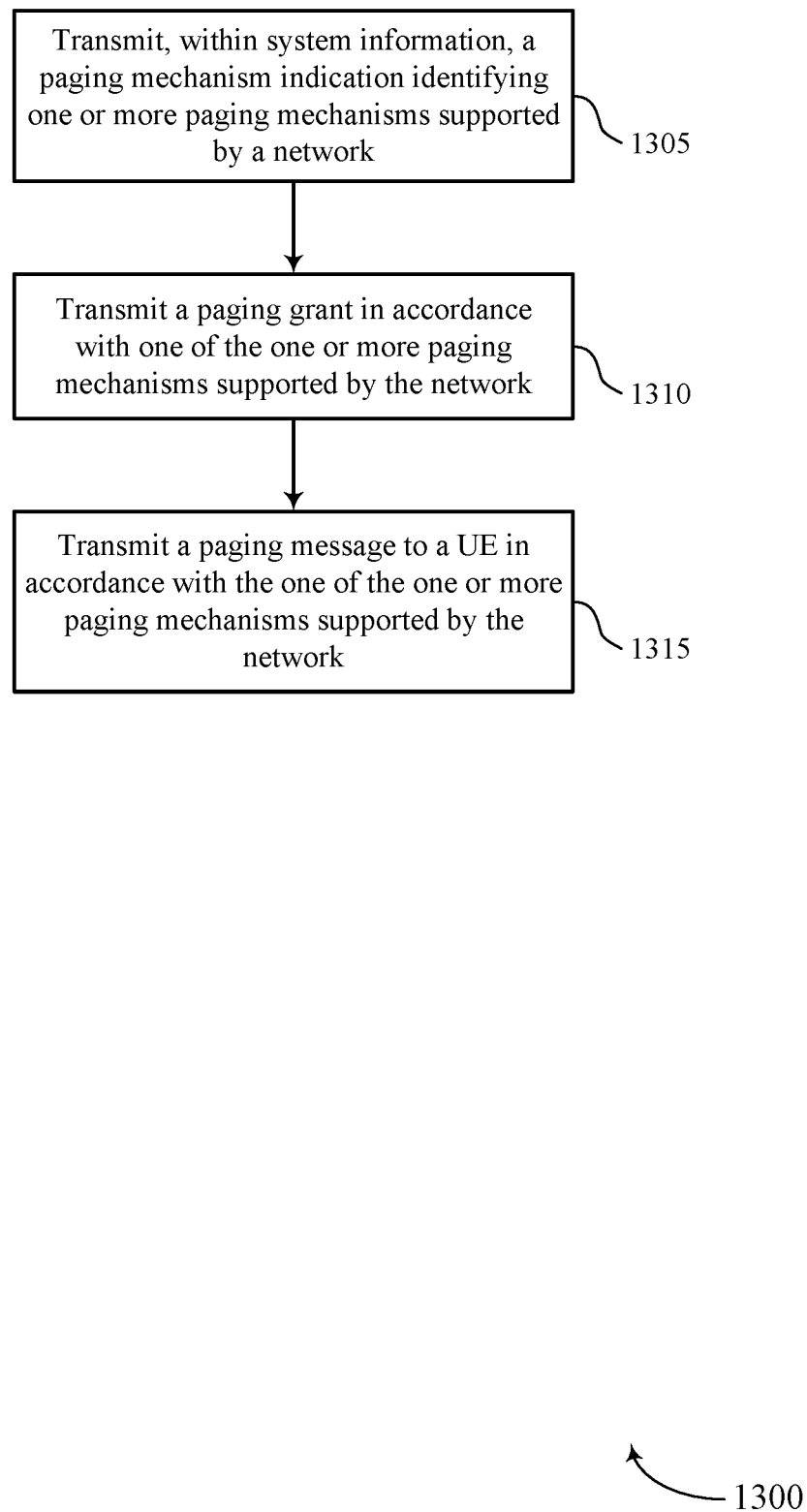
FIGS. 13 through 16 illustrate methods for conveying presence of enhanced paging mechanism in accordance with aspects of the present disclosure.

FIG. 13 shows a flowchart illustrating a method 1300 for conveying presence of enhanced paging mechanism in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1305 the base station 105 may transmit, within system information, a paging mechanism indication identifying one or more paging mechanisms supported by a network. The operations of 1305 may be performed according to the methods described herein. In certain examples, aspects of the operations of 1305 may be performed by a paging mechanism indication manager as described with reference to FIGS. 5 through 8.

At 1310 the base station 105 may transmit a paging grant in accordance with one of the one or more paging mechanisms supported by the network. The operations of 1310 may be performed according to the methods described herein. In certain examples, aspects of the operations of 1310 may be performed by a paging grant manager as described with reference to FIGS. 5 through 8.

At 1315 the base station 105 may transmit a paging message to a user equipment (UE) in accordance with the one of the one or more paging mechanisms supported by the network. The operations of 1315 may be performed according to the methods described herein. In certain examples, aspects of the operations of 1315 may be performed by a paging message manager as described with reference to FIGS. 5 through 8.

Figure 14:
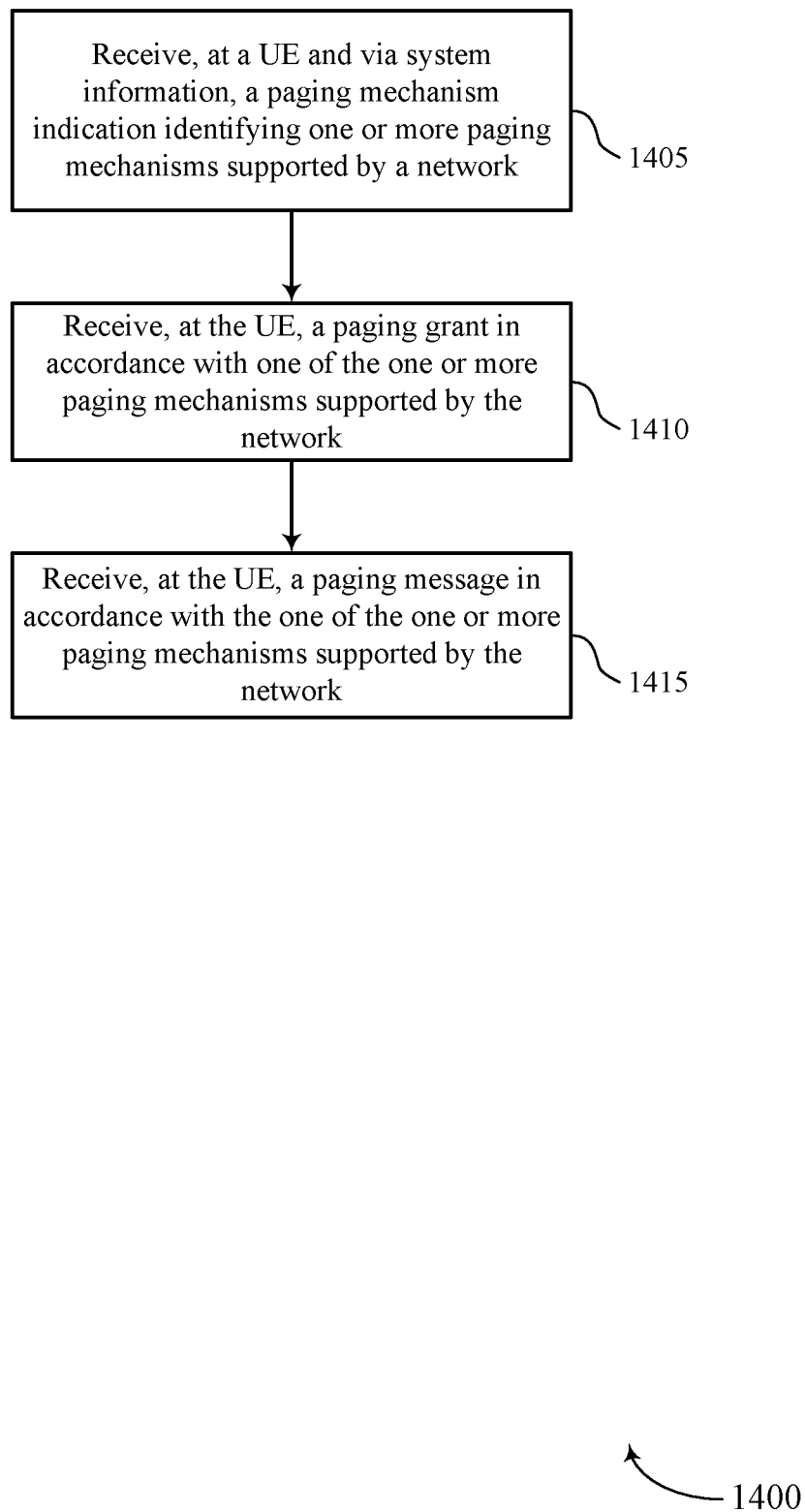

FIG. 14 shows a flowchart illustrating a method 1400 for conveying presence of enhanced paging mechanism in accordance with aspects of the present disclosure. The operations of method 1400 may be implemented by a UE 115 or its components as described herein. For example, the operations of method 1400 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, at a UE and via system information, a paging mechanism indication identifying one or more paging mechanisms supported by a network. The operations of 1405 may be performed according to the methods described herein. In certain examples, aspects of the operations of 1405 may be performed by a paging mechanism indication manager as described with reference to FIGS. 9 through 12.

At 1410 the UE 115 may receive, at the UE, a paging grant in accordance with one of the one or more paging mechanisms supported by the network. The operations of 1410 may be performed according to the methods described herein. In certain examples, aspects of the operations of 1410 may be performed by a paging grant manager as described with reference to FIGS. 9 through 12.

At 1415 the UE 115 may receive, at the UE, a paging message in accordance with the one of the one or more paging mechanisms supported by the network. The operations of 1415 may be performed according to the methods described herein. In certain examples, aspects of the operations of 1415 may be performed by a paging message manager as described with reference to FIGS. 9 through 12.

Figure 15:
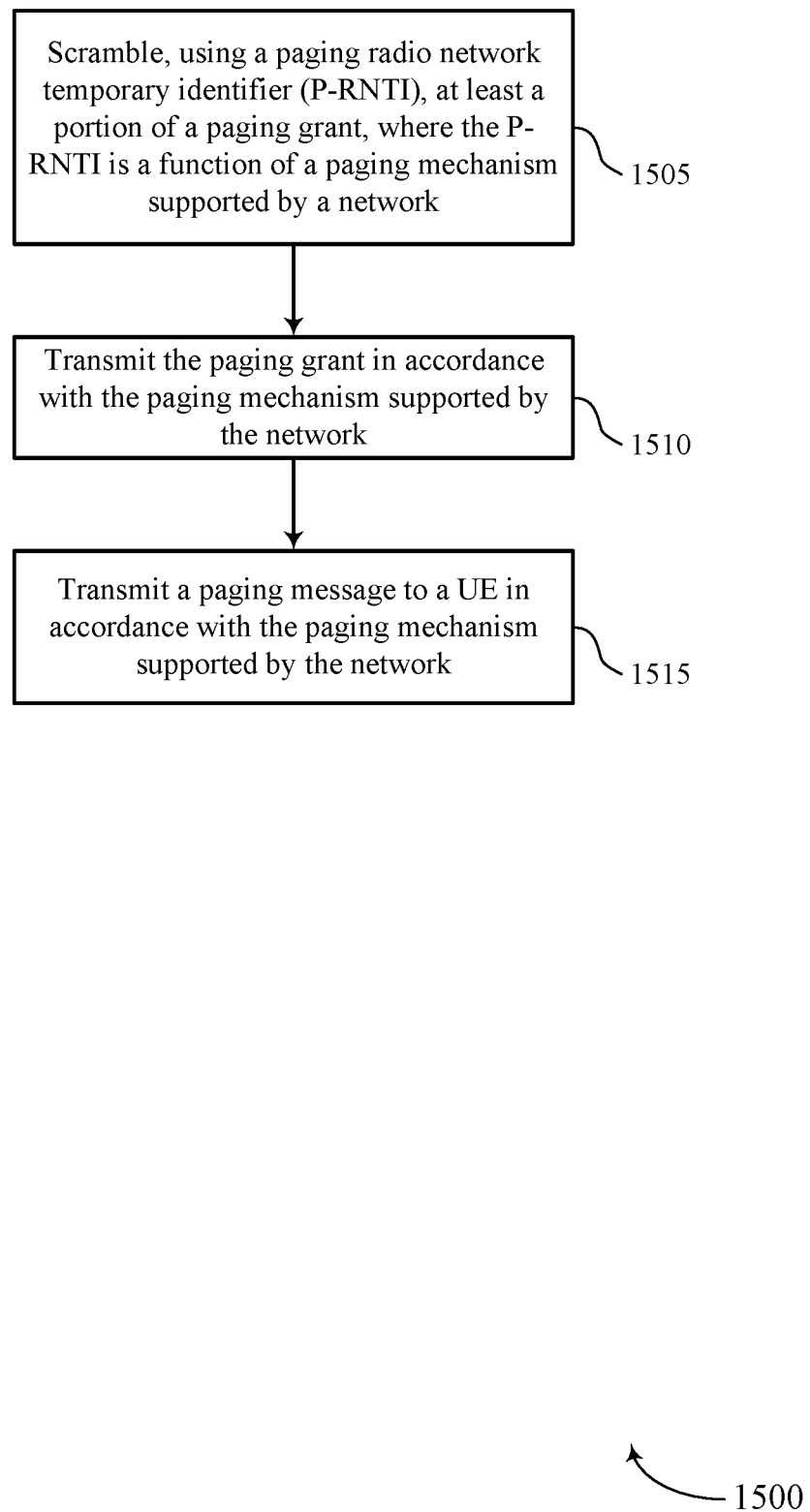

FIG. 15 shows a flowchart illustrating a method 1500 for conveying presence of enhanced paging mechanism in accordance with aspects of the present disclosure. The operations of method 1500 may be implemented by a base station 105 or its components as described herein. For example, the operations of method 1500 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may scramble, using a P-RNTI, at least a portion of a paging grant, wherein the P-RNTI is a function of a paging mechanism supported by a network. The operations of 1505 may be performed according to the methods described herein. In certain examples, aspects of the operations of 1505 may be performed by a paging mechanism indication manager as described with reference to FIGS. 5 through 8.

At 1510 the base station 105 may transmit the paging grant in accordance with the paging mechanism supported by the network. The operations of 1510 may be performed according to the methods described herein. In certain examples, aspects of the operations of 1510 may be performed by a paging grant manager as described with reference to FIGS. 5 through 8.

At 1515 the base station 105 may transmit a paging message to a user equipment (UE) in accordance with the paging mechanism supported by the network. The operations of 1515 may be performed according to the methods described herein. In certain examples, aspects of the operations of 1515 may be performed by a paging message manager as described with reference to FIGS. 5 through 8.

Figure 16:
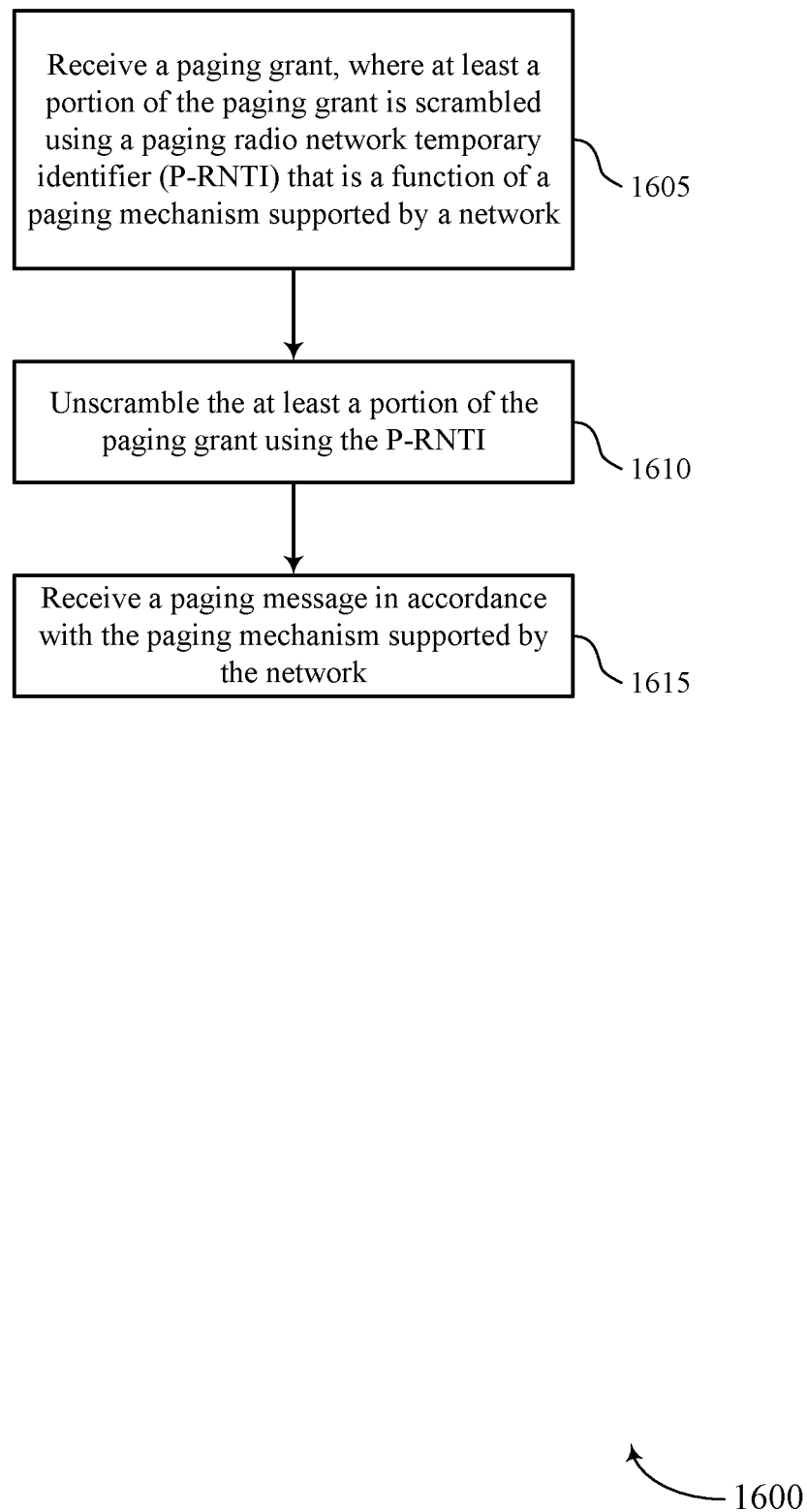

FIG. 16 shows a flowchart illustrating a method 1600 for conveying presence of enhanced paging mechanism in accordance with aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive a paging grant, wherein at least a portion of the paging grant is scrambled using a P-RNTI that is a function of a paging mechanism supported by a network. The operations of 1605 may be performed according to the methods described herein. In certain examples, aspects of the operations of 1605 may be performed by a paging mechanism indication manager as described with reference to FIGS. 9 through 12.

At 1610 the UE 115 may unscramble the at least a portion of the paging grant using the P-RNTI. The operations of 1610 may be performed according to the methods described herein. In certain examples, aspects of the operations of 1610 may be performed by a paging grant manager as described with reference to FIGS. 9 through 12.

At 1615 the UE 115 may receive a paging message in accordance with the paging mechanism supported by the network. The operations of 1615 may be performed according to the methods described herein. In certain examples, aspects of the operations of 1615 may be performed by a paging message manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    broadcasting, within a system information block message, a paging mechanism indication identifying one or more paging mechanisms supported by a network, the paging mechanism indication being an index whose value corresponds to different ones of the one or more paging mechanisms supported by the network;
    transmitting a paging grant separate from the system information block message using one of the one or more paging mechanisms supported by the network; and
    transmitting a paging message to a user equipment (UE) using the one of the one or more paging mechanisms supported by the network and based at least in part on the paging grant.

2. The method of claim 1, wherein broadcasting the paging mechanism indication comprises:
    transmitting the paging mechanism indication via a master information block (MIB), the system information message block comprising the MIB.

3. The method of claim 1, wherein broadcasting the paging mechanism indication comprises:
    transmitting the paging mechanism indication via remaining minimum system information (RMSI), the system information block message comprising the RMSI.

4. The method of claim 1, wherein broadcasting the paging mechanism indication comprises:
    transmitting the paging mechanism indication via broadcast other system information (OSI), the system information block message comprising the OSI.

5. The method of claim 1, wherein the paging mechanism indication is a one-bit indication.

6. The method of claim 1, wherein the paging mechanism indication identifies whether the network supports a first paging mechanism or any of a plurality of enhanced paging mechanisms.

7. The method of claim 1, further comprising:
    organizing the UE into a first group of a plurality of groups of UEs;
    transmitting, in a plurality of directions corresponding to a plurality of transmit beams, a paging indication to UEs in the first group; and
    receiving, from the UE and in response to the paging indication, a beam indication identifying one or more transmit beams of the plurality of transmit beams on which the UE received the paging indication.

8. The method of claim 7, wherein transmitting the paging grant using one of the one or more paging mechanisms supported by the network comprises:
transmitting the paging grant on the one or more transmit beams corresponding to the beam indication.

9. The method of claim 8, wherein transmitting the paging message to the UE using the one of the one or more paging mechanisms supported by the network comprises:
transmitting the paging message to the UE on the one or more transmit beams corresponding to the beam indication.

10. The method of claim 1, further comprising:
organizing the UE into a first group of a plurality of groups of UEs; and
transmitting, in a paging indication to UEs in the first group, an indication that the UEs are organized in the first group.

11. The method of claim 10, wherein transmitting the paging grant using one of the one or more paging mechanisms supported by the network comprises:
including a paging index in the paging grant, indicating that the paging grant is for the UEs of the first group.

12. The method of claim 1, wherein transmitting the paging message to the UE using the one of the one or more paging mechanisms supported by the network further comprises:
transmitting an indication of the UE for which the paging message is intended in the paging message.

13. A method for wireless communication, comprising:
receiving, at a user equipment (UE) and via a broadcasted system information block message, a paging mechanism indication identifying one or more paging mechanisms supported by a network, the paging mechanism indication being an index whose value corresponds to different ones of the one or more paging mechanisms supported by the network;
receiving, at the UE, a paging grant separate from the system information block message using one of the one or more paging mechanisms supported by the network; and
receiving, at the UE, a paging message using the one of the one or more paging mechanisms supported by the network and based at least in part on the paging grant.

14. The method of claim 13, wherein receiving the paging mechanism indication comprises:
receiving the paging mechanism indication via a master information block (MIB), the system information block message comprising the MIB.

15. The method of claim 13, wherein receiving the paging mechanism indication comprises:
receiving the paging mechanism indication via remaining minimum system information (RMSI), the system information block message comprising the RMSI.

16. The method of claim 13, wherein receiving the paging mechanism indication comprises:
receiving the paging mechanism indication via broadcast other system information (OSI), the system information block message comprising the OSI.

17. The method of claim 13, wherein the paging mechanism indication is a one-bit indication.

18. The method of claim 13, wherein the paging mechanism indication identifies whether the network supports a first paging mechanism or any of a plurality of enhanced paging mechanisms.

19. The method of claim 13, further comprising:
receiving a paging indication via one or more transmit beams corresponding to different transmit directions from the network; and
transmitting, in response to the paging indication, a beam indication identifying the one or more transmit beams of the plurality of transmit beams on which the UE received the paging indication.

20. The method of claim 19, wherein receiving the paging grant using one of the one or more paging mechanisms supported by the network comprises:
receiving the paging grant via at least one of the one or more transmit beams corresponding to the beam indication.

21. The method of claim 19, wherein receiving the paging message using the one of the one or more paging mechanisms supported by the network comprises:
receiving the paging message via the at least one of the one or more transmit beams corresponding to the beam indication.

22. The method of claim 13, further comprising:
receiving, in a physical downlink control channel (PDCCH), a paging index indicating that a paging grant is for UEs of a first group.

23. The method of claim 22, further comprising:
decoding a physical downlink shared channel (PDSCH) in response to the UE being included in the first group; or
refraining from decoding the PDSCH in response to the UE not being included in the first group.

24. The method of claim 13, wherein receiving the paging message using the one of the one or more paging mechanisms supported by the network further comprises:
receiving, in the paging message, an indication that the paging message is intended for the UE.

25. An apparatus for wireless communication, comprising:
a processor;
memory coupled with the processor; and
instructions stored in the memory and executable by the processor to cause the apparatus to:
broadcast, within a system information block message, a paging mechanism indication identifying one or more paging mechanisms supported by a network, the paging mechanism indication being an index whose value corresponds to different ones of the one or more paging mechanisms supported by the network;
transmit a paging grant separate from the system information block message using one of the one or more paging mechanisms supported by the network; and
transmit a paging message to a user equipment (UE) using the one of the one or more paging mechanisms supported by the network and based at least in part on the paging grant.

26. The apparatus of claim 25, wherein the instructions to broadcast the paging mechanism indication are executable by the processor to cause the apparatus to:
transmit the paging mechanism indication via a master information block (MIB), the system information block message comprising the MIB.

27. The apparatus of claim 25, wherein the instructions to broadcast the paging mechanism indication are executable by the processor to cause the apparatus to:
transmit the paging mechanism indication via remaining minimum system information (RMSI), the system information block message comprising the RMSI.

28. The apparatus of claim 25, wherein the instructions to broadcast the paging mechanism indication are executable by the processor to cause the apparatus to:

transmit the paging mechanism indication via broadcast other system information (OSI), the system information message block comprising the OSI.

29. An apparatus for wireless communication at a user equipment (UE), comprising:

a processor;

memory coupled with the processor; and instructions stored in the memory and executable by the processor to cause the apparatus to:

receive, at the UE and via a broadcasted system information block message, a paging mechanism indication identifying one or more paging mechanisms supported by a network, the paging mechanism indication being an index whose value corresponds to different ones of the one or more paging mechanisms supported by the network;

receive, at the UE, a paging grant separate from the system information block message using one of the one or more paging mechanisms supported by the network; and receive, at the UE, a paging message using the one of the one or more paging mechanisms supported by the network and based at least in part on the paging grant.

30. The apparatus of claim 29, wherein the instructions to receive the paging mechanism indication are further executable by the processor to cause the apparatus to:

receive the paging mechanism indication via a master information block (MIB), the system information block message comprising the MIB.

* * * * *